(12) United States Patent
Chu et al.

(10) Patent No.: US 12,300,289 B2
(45) Date of Patent: May 13, 2025

(54) HOLOGRAPHIC STORAGE

(71) Applicant: Microsoft Technology Licensing, LLC, Redmond, WA (US)

(72) Inventors: Jiaqi Chu, Cambridge (GB); Benn Charles Thomsen, Cambridge (GB); Dushyanth Narayanan, Cambridge (GB); Antony Ian Taylor Rowstron, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/631,043

(22) Filed: Apr. 10, 2024

(65) Prior Publication Data

US 2024/0257834 A1    Aug. 1, 2024

Related U.S. Application Data

(63) Continuation of application No. 17/905,850, filed as application No. PCT/US2021/018954 on Feb. 22, 2021, now Pat. No. 11,984,145.

(30) Foreign Application Priority Data

Mar. 26, 2020 (EP) .................................... 20165926

(51) Int. Cl.
 *G11B 7/0065* (2006.01)
 *G11B 7/08* (2006.01)
 *G11B 7/135* (2012.01)

(52) U.S. Cl.
 CPC ............ *G11B 7/0065* (2013.01); *G11B 7/083* (2013.01); *G11B 7/135* (2013.01)

(58) Field of Classification Search
 CPC ....... G11B 7/0065; G11B 7/083; G11B 7/135; G11B 7/0045
 See application file for complete search history.

(56) References Cited

U.S. PATENT DOCUMENTS 5,126,862 A    6/1992    Hong
5,835,458 A    11/1998   Bischel
(Continued)

FOREIGN PATENT DOCUMENTS

CN    1502064 A    6/2004
CN    1540458 A    10/2004
(Continued)

OTHER PUBLICATIONS

Non-Final Office Action issued in U.S. Appl. No. 18/406,083, mailed on Sep. 17, 2024, 10 Pages.
(Continued)

*Primary Examiner* — Andrew Sasinowski
(74) *Attorney, Agent, or Firm* — Barta Jones, PLLC

(57) ABSTRACT

A method of performing a write operation in a holographic data storage system, in which schedule schedules at least one write operation across multiple non-contiguous write intervals, the write operation pertaining to a set of data to be stored in a region of a holographic recording medium. In each of the non-contiguous write intervals, the region of the holographic recording medium is exposed to an interference pattern caused by interference between a reference beam and an input beam carrying the set of data. The multiple non-contiguous write intervals have a total aggregate duration of sufficient length to cause a persistent state change in the exposed region, such that the set of data is recoverable from that region by the end of a final write interval of the multiple non-contiguous write intervals.

20 Claims, 13 Drawing Sheets

(56) References Cited

U.S. PATENT DOCUMENTS

| | | |
|---|---|---|
| 6,205,107 B1 | 3/2001 | Burr |
| 6,577,785 B1 | 6/2003 | Spahn |
| 7,315,501 B1 | 1/2008 | Ramanujam |
| 7,557,971 B1 | 7/2009 | Sigel et al. |
| 10,942,430 B2 | 3/2021 | Waldern |
| 11,281,013 B2 | 3/2022 | Popovich |
| 11,894,035 B2 | 2/2024 | Kelly |
| 11,984,145 B2 | 5/2024 | Chu |
| 11,990,165 B2 | 5/2024 | Kelly |
| 2002/0075776 A1 | 6/2002 | Kasazumi |
| 2003/0048975 A1 | 3/2003 | Lackritz |
| 2003/0086639 A1* | 5/2003 | Ling ............... G02B 6/3582 385/17 |
| 2003/0137706 A1 | 7/2003 | Rmanujam |
| 2005/0174618 A1 | 8/2005 | Edwards |
| 2005/0185230 A1 | 8/2005 | Kuroda |
| 2006/0193232 A1 | 8/2006 | Redfield |
| 2008/0239428 A1 | 10/2008 | Bell |
| 2011/0116094 A1 | 5/2011 | Allsop |
| 2012/0051204 A1 | 3/2012 | Ohnishi |
| 2015/0063089 A1 | 3/2015 | Liu |
| 2018/0136383 A1* | 5/2018 | Choi ............... G02B 6/0023 |
| 2018/0284460 A1 | 10/2018 | Cheng et al. |
| 2019/0113829 A1* | 4/2019 | Waldern .......... G06F 3/013 |
| 2023/0360674 A1 | 11/2023 | Kelly |
| 2024/0144969 A1 | 5/2024 | Kelly |

FOREIGN PATENT DOCUMENTS

| | | |
|---|---|---|
| CN | 101025942 A | 8/2007 |
| CN | 101034280 A | 9/2007 |
| CN | 102831902 A | 12/2012 |
| CN | 103443700 A | 12/2012 |
| CN | 109154717 A | 1/2019 |
| CN | 110831478 A | 2/2020 |
| JO | 2013195802 A | 9/2013 |
| JP | 2003521744 A | 7/2003 |
| JP | 2003248416 A | 9/2003 |
| JP | 2003255418 A | 9/2003 |
| JP | 2004004434 A | 1/2004 |
| JP | 2005512128 A | 4/2005 |
| JP | 2005518556 A | 6/2005 |
| JP | 2005326710 A | 11/2005 |
| JP | 2006154163 A | 6/2006 |
| JP | 2013536451 A | 9/2013 |
| JP | 2016051979 A | 4/2016 |
| JP | 2019053127 A | 4/2019 |
| JP | 2019520595 A | 7/2019 |
| KR | 100626947 B1 | 9/2006 |
| KR | 20080033065 A | 4/2008 |
| KR | 20180117181 A | 10/2018 |
| WO | 2001091127 A2 | 11/2001 |
| WO | 2009051775 A1 | 4/2009 |
| WO | 2011148460 A1 | 12/2011 |
| WO | 2013175525 A1 | 11/2013 |
| WO | 2017094369 A1 | 6/2017 |

OTHER PUBLICATIONS

Non-Final Office Action mailed on Jul. 17, 2024, in U.S. Appl. No. 17/904,788, 17 pages.

Office Action Received for Chinese Application No. 202180024037.6, mailed on Mar. 29, 2024, 15 pages (English Translation Provided).

Notice of Allowance mailed on Oct. 30, 2024, in U.S. Appl. No. 17/904,788 11 pages.

Final Office Action issued in U.S. Appl. No. 18/406,083, mailed on Jan. 7, 2025, 13 Pages.

Notice of Allowance mailed on Nov. 13, 2024, in U.S. Appl. No. 18/636,249, 8 pages.

Communication pursuant to Article 94(3) EPC, Received for European Application No. 21711983.3, mailed on Nov. 13, 2024, 4 pages.

Notice of Reasons for Refusal for Japanese Application No. 2022-547196, mailed on Dec. 26, 2024, 6 Pages. (English Translation Provided).

Decision to Grant for Japanese Application No. 2022549326, mailed on Jan. 23, 2025, 05 pages (English Translation Provided).

Office Action Received for Japanese Application No. 2022-547893, mailed on Jan. 8, 2025, 10 pages (English translation Provided).

Communication Pursuant to Article 94(3) Received for European Application No. 21710852.1, mailed on Feb. 7, 2025, 12 pages.

Communication pursuant to Article 94(3) received in European Application No. 21716577.8, mailed on Feb. 18, 2025, 10 pages.

Corrected Notice of Allowability mailed on Jan. 15, 2025, in U.S. Appl. No. 18/636,249, 2 pages.

First Office Action Received for Chinese Patent Application No. 202180024715.9, mailed on Feb. 5, 2025, 22 Pages. (English Translation Provided).

Communication under Rule 71(3) received in European Application No. 21710853.9, mailed on Feb. 18, 2025, 07 pages.

Office Action Received for Korean Application No. 1020227034559, mailed on Mar. 21, 2025, 11 pages.

Office Action Received for Korean Application No. 1020227034720, mailed on Mar. 21, 2025, 22 pages.

First Office Action Received for Chinese Application No. 202180024730.3, mailed on Mar. 13, 2025, 12 pages. (English Translation Provided).

* cited by examiner

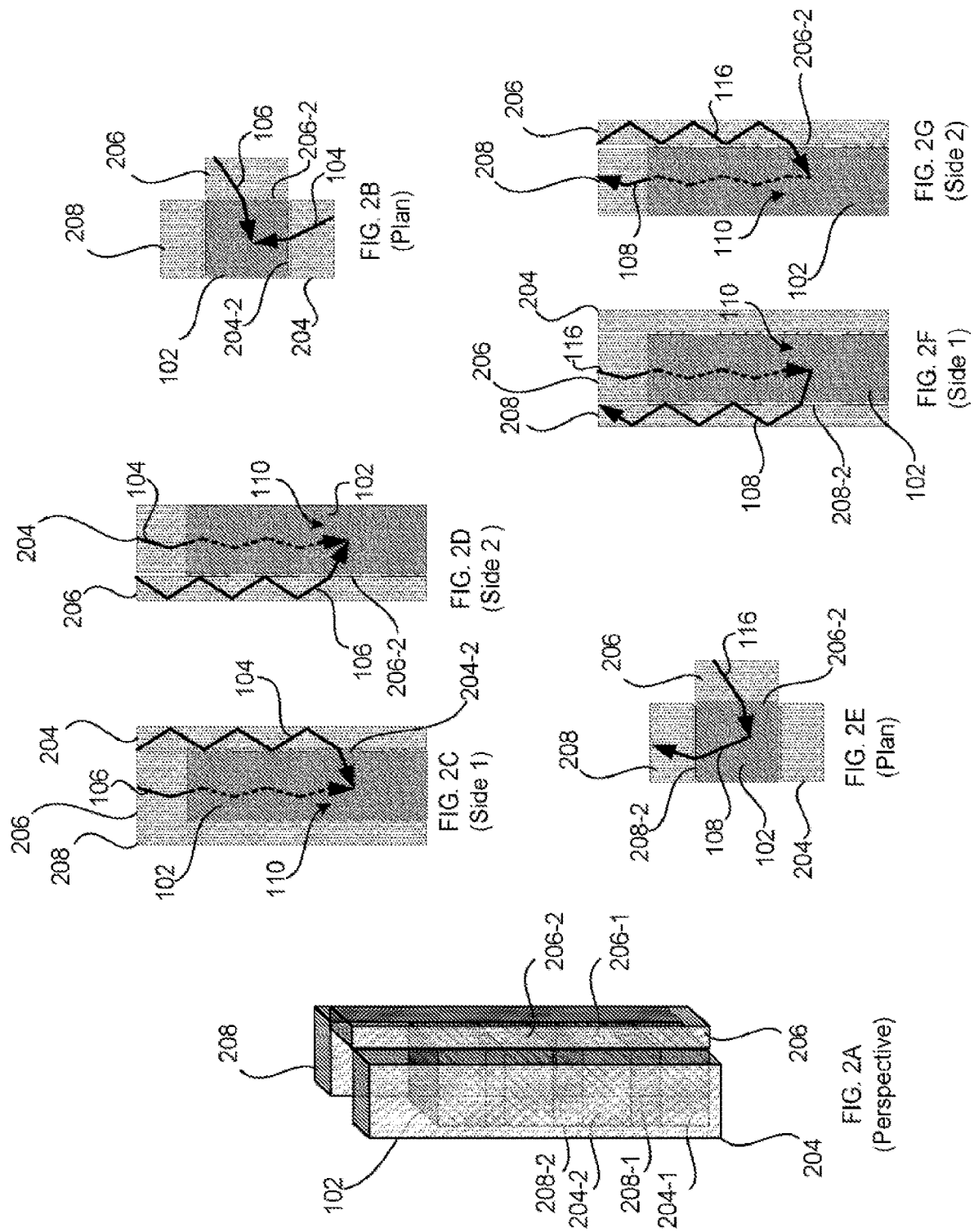

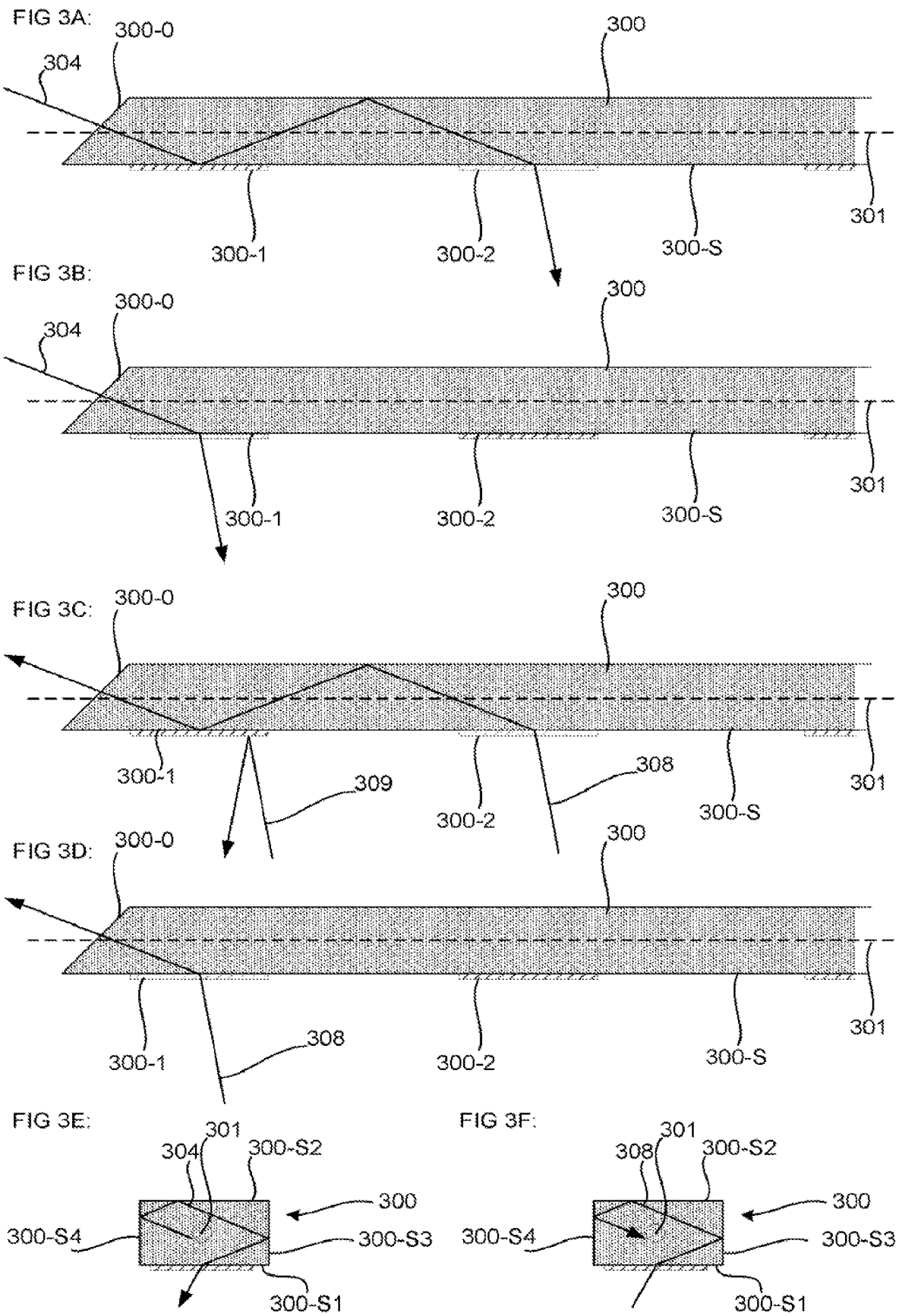

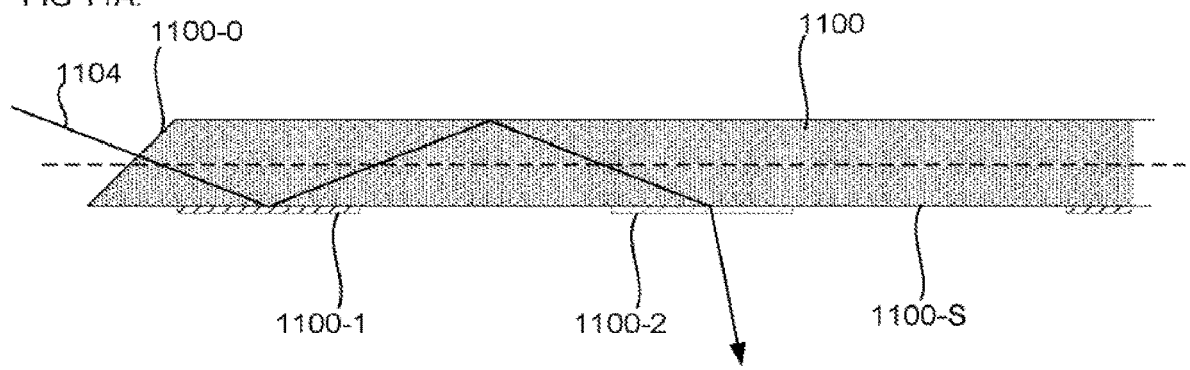
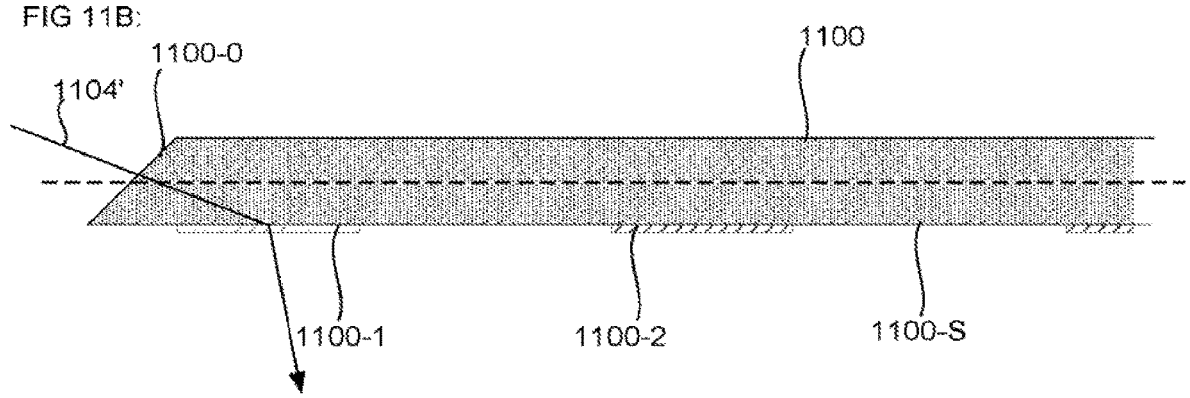

HOLOGRAPHIC STORAGE

CROSS-REFERENCE TO RELATED APPLICATIONS

This application is a continuation application of and claims priority to U.S. patent application Ser. No. 17/905,850, entitled "HOLOGRAPHIC STORAGE," filed on Sep. 8, 2022, which is a 371 application of and claims priority to International Patent Application No. PCT/US2021/018954, entitled "HOLOGRAPHIC STORAGE," filed on Feb. 22, 2021, which claims priority to EP Patent Application No. 20165926.5, filed on Mar. 26, 2020, the disclosures of which are incorporated herein by reference in their entireties.

TECHNICAL FIELD

The present disclosure pertains generally to holographic storage.

BACKGROUND

Holographic storage is a form of computer storage, in which information is recorded in a light-sensitive holographic recording medium by exposing the medium to optical patterns. For example, a region (sub-volume) of the medium may be exposed to an optical interference pattern caused by interference between a reference beam and an input beam in which a set of data is embedded. The beams may, for example, be laser beams generated using a single laser and a beam splitter. Spatial light modulation (SLM) may be used to embed the set of data in the input beam, e.g. an image encoding the set of data may be spatially modulated into the input beam. For the avoidance of doubt, herein the terms "light", "optical" and the like are not restricted to visible light. Holographic storage can, for example, be implemented using infrared or ultraviolet beams within non-visible portions of the electromagnetic spectrum.

With sufficient beam power and exposure time, the optical interference pattern causes a persistent state change within the sub-volume (at this point, the interference pattern is said herein to be persistently recorded or written to the sub volume). The changed state of the sub-volume is such that, upon exposing the sub-volume to a substantially matching reference beam at a later time, the interaction between the matching reference beam and the sub-volume creates an output beam that essentially matches the original input beam, in the sense that the set of data originally embedded in the input beam can be recovered from the output beam (this may be referred to herein as reading the recorded pattern).

Rather than storing individual bits as discrete units, a single interference pattern can encode a large number (e.g. millions) of bits. For example, the set of data could be a megapixel image embedded in the input beam. Moreover, it is possible to record many such patterns (e.g. hundreds or thousands) to the same sub-volume, by exploiting the sensitivity of certain forms of holographic recording media to small changes in the angle of the reference beam. For such media, when an interference pattern is created with the reference beam at a given angle, the recorded pattern can only be read using a reference beam that closely matches the reference beam originally used to create it. This effect can be exploited to record multiple patterns (encoding different data sets) to the same sub-volume at different reference beam angles. Theoretically, the data storage capacity is limited only by the wavelength of the beams, with the potential to hundreds of megabytes per cubic millimetre for red light and tens of gigabytes for ultraviolet. In practice, there may be other limiting factors but there is nevertheless significant potential for high-density data storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

The present disclosure pertains to the scheduling of write operations in a holographic data storage system in an energy efficient manner. Herein, a write operation pertains to a set of data, such as an image, to be carried by an input beam, and recorded in a holographic recording region as an interference pattern caused by interference between the input beam and a reference beam. In order to store the data in a recoverable form, i.e. such that is can be read from the holographic recording region at a later time, the region needs to be exposed to the pattern for a sufficient duration (that will depend on the power of the beams).

Surprisingly, it has been discovered that, by "staggering" a write operation across multiple, non-contiguous write intervals, i.e. by exposing the holographic recording medium to an interference pattern, as above, in each of the non-contiguous write intervals, but not in the intervening time interval(s) separating the non-contiguous write intervals ("pulse" write), the total aggregate exposure time required to record the pattern is less that the total time that would be required if the region were to be exposed to the pattern in a single, continuous write interval instead ("continuous" write).

A first aspect herein provides a method of performing a write operation in a holographic data storage system. A schedule schedules at least one write operation across multiple non-contiguous write intervals, the write operation pertaining to a set of data to be stored in a region of a holographic recording medium. In each of the non-contiguous write intervals, the region of the holographic recording medium is exposed to an interference pattern caused by interference between a reference beam and an input beam carrying the set of data. The multiple non-contiguous write intervals have a total aggregate duration of sufficient length to cause a persistent state change in the exposed region, such that the set of data is recoverable from that region by the end of a final write interval of the multiple non-contiguous write intervals.

BRIEF DESCRIPTION OF FIGURES

For a better understanding of the present disclosure, and to show how embodiments of the same may be carried into effect, reference is made by way of example only to the following figures in which:

FIG. 2A shows a schematic perspective view of a holographic storage system comprising a set of waveguides that may be used to guide beams to/from different sub-volumes of a holographic recording medium to provide spatial multiplexing over the medium; FIGS. 2B, 2C and 2D show, respectively, plan and alternate side views of the system during a write interval; FIGS. 2E-G shows plan and alternate side views during a read interval;

FIGS. 3A-3D show schematic side views of an active light pipe in various configurations; FIGS. 3E and 3F shows a plan (cross section) view of the active light pipe;

FIGS. 11A and 11B show a light pipe with passive optical filters having different frequency responses;

DETAILED DESCRIPTION OF EXAMPLE EMBODIMENTS

Figure 1A:
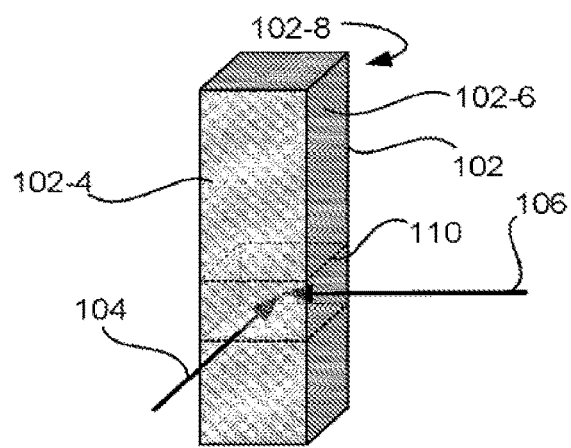
FIGS. 1A and 1B shows a schematic perspective view of a holographic recording medium.

Embodiments that implement the above-mentioned scheduling techniques are described below. First, some useful context is provided. The described embodiments implement the scheduling techniques in a holographic storage system that uses waveguide networks to facilitate spatial multiplexing over one or more holographic recording media without the need for mechanical movement of the media or the equipment used to read and write from it. Whilst there are additional benefits to this combination, it is important to note that the present scheduling techniques can be implemented in any holographic storage context.

The described embodiments combine the scheduling techniques with a waveguide architecture to achieve efficient spatial multiplexing over one or more holographic storage media, in a way that also reduces or eliminates the need for mechanical movement, "active" light pipes, "passive" light pipes or a combination of active and passive light pipes can be used. Note, the terms "waveguide" and "light pipe" are used interchangeably herein, An "active light pipe" refers to a waveguide which has one or more active switching elements or other guiding elements attached to the surface of the waveguide or within the bulk of the waveguide, which in turn are configurable (i.e. have changeable optical properties) to effect "one-to-many" optical transfer, i.e. where light is guided from a first surface region to one of multiple possible second surface regions (in this case, the first surface region acts as an in-coupling region and the second regions act as out-coupling regions), or "many-to-one" optical transfer, i.e. where light can be guided from any one of the second surface regions (now acting as in-coupling regions) to the same first surface region (now acting as an out-coupling region). The term "passive light pipe" refers to a light pipe with guiding elements, having different optical sensitivity (e.g. different wavelength and/or polarization sensitivity), so that similar effect can be achieved by instead varying an optical characteristic(s) or the beam (e.g. varying its wavelength, polarization etc. to cause it to be guided along different routes by the guiding elements with different wavelength/polarization responses etc.; e.g. using a tuneable laser). The term "passive light guide" is merely a convenient label, consistent with the fact that, in this case, the guiding elements are not required to be active—however, active or passive guiding elements with different optical sensitivity (e.g. different wavelength and/or polarization sensitivity etc.) could be used in this context (that is, the guiding elements could be both active and have different optical sensitivities).

A digital image (or data encoded as a digital image) may be propagated as a beam along an active or passive light pipe. The guiding elements of the active light pipe can be individually controlled to either transmit or reflect an incident beam of light.

Many such light pipes (active, passive or a combination of both types) can be combined in various geometries to create a switching network that can be used to steer the beams and images to one of many addressable locations, in one or multiple spatial dimensions. The input to a light pipe can be created using a spatial light modulator (SLM) and the output read out on a CCD (charge-coupled device), for example. Phase interference and noise can be corrected using a combination of optical and computation techniques, including machine learning techniques. Certain embodiments use coherent detection in combination with such techniques to provide more effective waveguide distortion mitigation.

In contrast to optical switches and fibres of the kind traditionally used in optical data communication, the described embodiments use light pipes that are able to transfer an entire image at a time. This exploits the high resolution of optical devices available today such as SLMs and digital cameras. These devices have many millions of pixels allowing megabytes of data to be encoded and decoded. This allows high bandwidth transmission even with modest switching rates for the SLMs, cameras, and active light pipe elements (in the case of active light pipes) or beam optical characteristics(s) (in the case of passive light pipes). In addition, applications such as holographic storage require interference between multiple beams, at least one of which is modulated with an image. In holographic storage, using active light pipes the beams and images can be efficiently steered, and made to interfere, at any desired location in a holographic storage medium. As noted, simpler benefits can be achieved with passive light pipes, where the switching is applied at the emitter stage instead.

The light pipes described below are "multimode" waveguides in the sense of having physical dimensions sufficient to support a range of "modes" (i.e. spatial paths through the waveguide for a given channel, e.g. corresponding to different directions of propagation). This is in contrast to simple single-mode optical waveguides, such as thin optical fibres used in fibre optic system, where the aim is to restrict light entering a fibre to essentially a single propagation mode. Whereas a single-mode optical waveguide can only convey data using amplitude, phase or frequency modulation, a multimode optical waveguide allows more data (e.g.

an entire image with potentially millions of pixels) to be conveyed by via angular variation within the waveguide. To put it another way, a multimode waveguide provides greater bandwidths through increased angular and/or spatial diversity, by providing multiple optical paths through the waveguide from emitter to detector for any given channel (the different paths corresponding to different propagation modes).

Another aspect disclosed herein is a holographic data storage system which uses one or more waveguide networks to spatially multiplex over a holographic recording medium (i.e. read and write from/to different sub-volumes of the media) without requiring any relative mechanical movement between the media and the waveguide network(s). An example of such a system is described below, which makes use of active and/or passive light pipes. In the described examples, a multimode waveguide can be used to carry an entire digital image to/from a holographic recording medium simultaneously, or to carry a reference beam at one of multiple possible angles.

Active Light Pipes:

FIGS. 3A-D show a schematic side-view of an example form of active light pipe 300 having a particular physical structure. As will be appreciated, this is merely one example of a suitable physical structure that can provide the desired optical configurability. Further examples are considered below.

The active light pipe 300 is shown to have at least first surface region 300-0 and multiple active switches in the form of switchable Bragg gratings (SBGs), which could be on the surface or volume-embedded. Two such SBGs 300-1, 300-2 are shown on a first surface 300-S1 of the waveguide 300 in this example, but it will be appreciated that there may be a greater number of SBGs disposed at suitable locations on the surface 300-S1 of the waveguide 300 and/or embedded within the bulk of the waveguide 300. Each SBG 300-1, 300-2 can be individually controlled to change its reflective/transmissive properties so as to either transmit or reflect an incident beam. The SBGs 300-1, 300-2 form respective surface regions of the active light pipe 300, at which light can enter the waveguide 300 (in-coupling) or exit the waveguide 300 (out-coupling) depending on how the waveguide 300 is used.

The first surface region 300-0 is an end region of the waveguide 300, from which the first side surface 300-S1 of the waveguide extends along an axis 301 of the waveguide 300.

FIGS. 3E and 3F each show a cross section view of the waveguide 300, which can be seen, in this example, to have a rectangular shape in cross section, with four side surfaces 300-S1, 300-S2, 300-S2, 300-S4 extending along the axis 301 of the waveguide 300. In this example, the SBGs 300-1, 300-2 are all located along the first of the side surfaces 300-S1, as depicted in the figures, though in general such SBGs could be attached to multiple surfaces of the waveguide 300 depending on the application.

The SBGs 300-1, 300-2 are located along the first side surface of waveguide 300-S1 at increasing distances from the first region 300-0, with a first SBG 300-1 located closest to the first region 300-0.

FIGS. 3A, 3B and 3E depict a "one-to-many" use case, in which the first surface region 300-0 acts as an in-coupling region and the second surface regions of the SBGs 300-1, 300-2 act as out-coupling regions. By way of example, FIG. 3 shows a first ray 304 that is coupled into the waveguide 300 via the in-coupling region 300-0. In this example, the first surface region 300-0 is angled relative to the side surfaces 300-S1, . . . , 300-S4 such that the first ray 304 can pass through the first surface region 300-0 into the bulk of the waveguide 300 at an angle sufficient to achieve total internal reflection at each of the side surfaces 300-1, . . . , 300-4 within the waveguide 300.

Each of the SBGs 300-1, 300-2 is configurable to change it between a reflective state and a transmissive state. FIG. 3A shows a configuration in which the first SBG 300-1 is in a reflective state, causing the incident ray 300 to be reflected from it, back into the waveguide 300, and guided along the waveguide 300 until reaching the second SBG 300-2. The SBG 300-2 is shown in a transmissive state, causing the ray 304 to be diffracted out of the waveguide 300 via the second SBG 300-2, and thereby coupled out of the waveguide 300 via the surface region of the second SBG 300-2. This configuration of the SBGs 300-1, 300-2 creates a "channel" through the waveguide 300 between the first surface region 300-0 and the surface region of the second SBG 300-2.

In contrast, FIG. 3B shows the first SBG 300-1 in a transmissive state. Hence the first ray 304, upon reaching the first SBG 300-1, is instead diffracted out of the waveguide 300 via the first SBG 300-1, and thereby coupled out of the waveguide 300 via the surface region of the first SBG 300-1 instead. This configuration creates a channel through the waveguide 300 between the first surface region 300-0 and the surface region of the first SBG 300-1.

In this manner, it is possible to guide a first ray 304 through the waveguide 300 from the first region 300-0 and out of the waveguide 300 at the surface region of any of the SBGs 300-1, 300-2. Although described in relation to only two SBGs 300-1, 300-2 for the sake of simplicity, it will be appreciated that the same principles can be applied with a greater number of SBGs.

FIG. 3E shows how the first ray 304 might propagate when viewed in cross section, via TIR from some or all of the side surfaces 300-S1, . . . , 300-S4 depending on the angle of the first ray 304.

It is equally viable to use the depicted active light pipe 300 for many-to-one optical transfer, as depicted in FIGS. 3C, 3D and 3F.

FIG. 3C shows the same configuration of the SBGs as FIG. 3A. The only difference is how the waveguide 300 is used: now a second ray 308 is shown incident on the second SBG 300-2 from an external source (not shown). With the second SBG in a transmissive state, the second ray 308 is diffracted into the waveguide 300 via the second SBG (now providing in-coupling at its surface region), from which it is guided through the waveguide 300 to the first surface region 300-0 (now an out-coupling region); this includes reflection from the first SBG 300-1 currently in a reflective state. The reflective state of the first SBG 300-1 prevents the ray 308 from exiting the waveguide via the first SBG 300-1. Moreover, any external ray 309 that might happen to be incident on the first SBG 300-1 will be essentially reflected away from it and thus not enter the waveguide 300.

FIG. 3D shows the same configuration as FIG. 3B, but now with the second ray 308 incident on the first SBG 300-1 from an external source. With the first SBG 300-1 in a transmissive state, the third ray 310 enters the waveguide 300 thereat by diffraction, and is guided to the first surface region 300-0.

FIG. 3F shows how the second ray 308 might propagate within the waveguide 300 in cross section, and the same description of FIG. 3E applies but with the ray direction reversed.

The above description assumes perfect reflectivity/transmittivity of the SBGs in the transmissive/reflective states. As will be appreciated, this is not an absolute requirement in practice, and the system will have some tolerance to imperfections in the SBGs 300-1, 300-2 and the waveguide 300 more generally. Suitable signal processing techniques for compensating for distortion introduced within the waveguide 300 are describe later.

Although depicted as separate elements, the SBGs 300-1, 300-2 could in fact be separate, independently controllable regions of a single large SBG extending over all or most of the first side surface 300-S1.

SBGs are merely one possible form of active switching element. For example, with polarized beams, the same effects could be realized using controllable polarization filters, attached to the surface of the waveguide 300 or embedded within the bulk of the waveguide. SBGs and controllable polarization filters are examples of non-mechanical active switches which can change the optical properties of the waveguide 300 via non-mechanical effects. Other examples of guiding elements include controllable mirrors such as micro mirror devices or other microelectromechanical systems (MEMs), the latter being examples of mechanical guiding elements.

When using polarization filters as guiding elements, the SBGs 300-1, 300-2 could be replaced with passive diffractive elements, with the polarization filters acting to guide beams to or away from the passive diffractive elements as needed in a controllable fashion, without needing to reconfigure the diffractive elements.

Note that even when the guiding elements themselves are mechanical, this still avoids the need for mechanical movement of the waveguide 300 as a whole.

Active Light Pipe Network

Herein, a "waveguide network" can take the form of a single waveguide or multiple intercoupled waveguide networks. Waveguide networks with multiple active light pipes have particular benefits in terms of flexible optical data transfer.

Figure 4A:
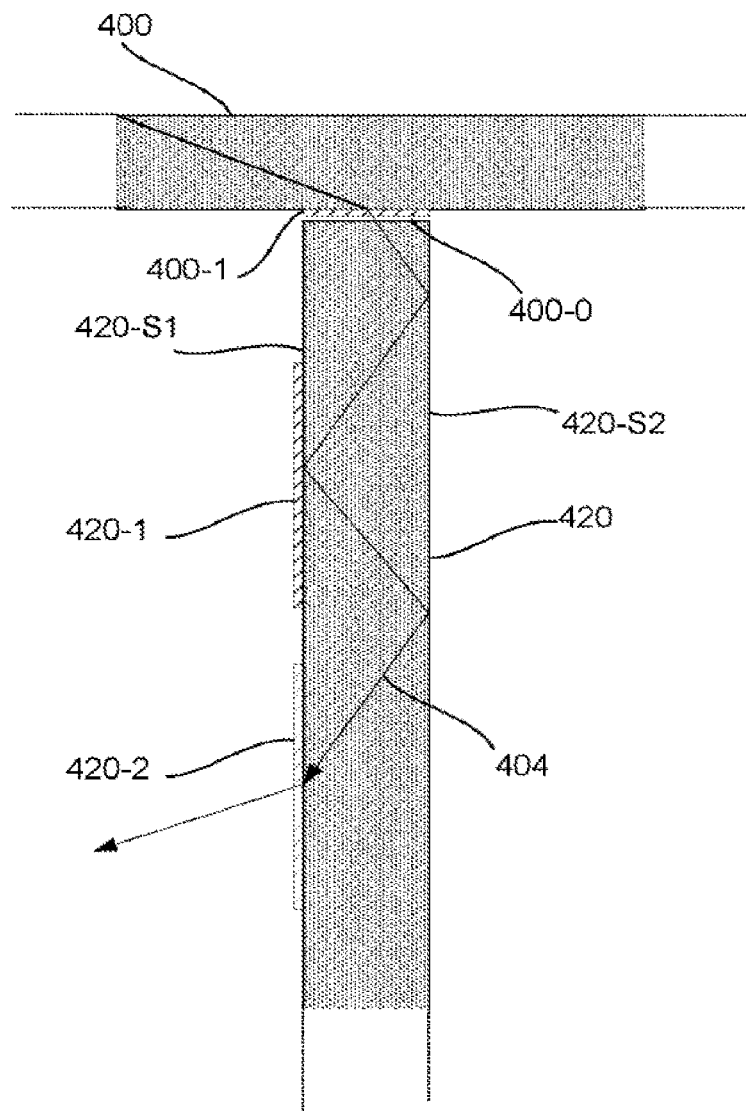
FIGS. 4A and 4B show alternate side views of (part of) an optical waveguide network.
Figure 4B:
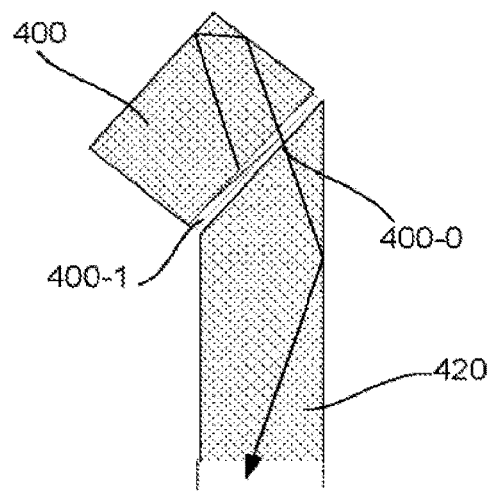

FIGS. 4A and 4B shows alternate side views of (part of) a waveguide network comprising first and second active light pipes 400, 420. The second light pipe 420 has a first surface region 420-0 located adjacent a corresponding surface region of the first light pipe 400 for receiving a beam from or guiding a beam to the second waveguide 420 via the first surface region 400-0. Purely by way of example, a ray 404 is shown propagating through the first waveguide 400 to the corresponding surface region of the first waveguide 400 that lies adjacent the first surface region 420-0 of the second waveguide 420. The ray 404 is coupled out of the first waveguide 400 via an SBG 400-1 attached to the adjacent surface region of the first waveguide 400, and into the second waveguide 420 via the first surface region 400-0. From there, it can be guided to any one of multiple SBGs 420-1, 420-2 of the second waveguide 420 in a one-to-many fashion. The same arrangement can be used to guide a beam in the other direction, from the second waveguide 420 into the first waveguide 400, in a many-to-one fashion, with the ray direction reversed.

Whilst this example considers two intercoupled waveguides 400, 402, the principles can be applied to a greater number of inter-coupled waveguides to allow flexible data routing through the waveguide network.

More generally, a surface region of a medium may be otherwise optically coupled to a corresponding surface region of a waveguide, for example via an air interface or one or more other optical components (which could themselves be waveguides that may or may not provide active or passive switching functionality).

Holographic Storage

An application of active light pipes to holographic storage will now be described.

Figure 1B:
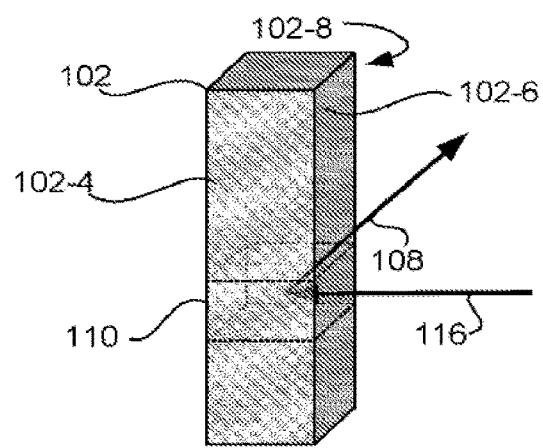

FIGS. 1A and 1B show schematic perspective views of a holographic recording medium 102, which is a volume of relatively thick, photosensitive material capable of persistently storing optical patterns as "holograms" embodied within the holographic recording medium 102 (which may be referred to as simply a medium 102 for conciseness). A hologram is created by exposing a sub-volume 110 (region) of the medium 102 to an optical pattern in a way that causes a persistent state change within that sub-volume 110. The hologram created with the sub-volume 110 by that state change records the optical pattern to the medium 102 such that the optical pattern can be reproduced therefrom at a later time. The hologram is persistent in that, once created, the medium 102 does not require power to maintain it. The composition and structure of the medium 102 may be such that a hologram cannot be erased once created and therefore provides a form of "write once read many" (WORM) storage, or it may be that holograms can be erased and replaced (but persist unless and until they are erased).

A single hologram can record an optical pattern that encodes a very large number (e.g. millions) of bits, allowing very large volumes of data to be written to/read from the holographic recording medium 102 in parallel (simultaneously) through exposure to/re-creation of the optical pattern. Another benefit of holographic storage is that many holograms can be written to the same sub-volume 110 of the holographic recording medium 102, which greatly increases the data storage capacity of the holographic recording medium 102 per unit volume.

In more detail, FIG. 1A shows how, in order to write a set of data to the medium 102, an input beam 104 and a reference beam 106 are directed into the sub-volume 110, via first and second side surfaces 102-4, 102-6 of the medium 102 respectively. This creates an optical pattern in the form of an interference pattern caused by interference between the input beam 104 and the reference beam 106. Provided the beams 104, 106 have sufficient power and the sub-volume 110 is exposed for a sufficient duration, the interference pattern created by the interfering beams 104, 106 will be persistently recorded within the sub-volume 110 as a hologram. A set of data is embedded in the input beam 104 and can be recovered from the resulting hologram as described below. In this manner, the encoded set of data is written to the sub-volume 110. In the examples below, the set of data is encoded as a digital image, which is then embedded in the input beam 104 via spatial modulation.

As shown in FIG. 1B, in order to read the data from the sub-volume 110, a matching reference beam 116 is directed into the sub-volume 110, via the second side surface 102-6 of the medium 102, where it interacts with the hologram to create an output beam 108 that will essentially match the input beam 104 used to write the hologram, to the extent that the embedded data is recoverable from the output beam 110. The output beam 108 propagates out of the sub-volume 110, via a third side surface 102-8 of the medium 102.

The reference beam 116 used to read the data substantially matches the reference beam 106 originally used to write the data, and in particular is directed at an angle (or, more generally, direction) that closely matches that of the original reference beam 106. This is because the ability to read the hologram (i.e. produce an output beam 108 from which the data can be recovered) is highly sensitive to angular deviation between the reference beams 106, 116 used to write and read the hologram respectively. It is this sensitivity that can be exploited to record multiple holograms within the same sub-volume 110—each hologram is created using a different reference beam angle, and two distinct holograms may be created with only a slight difference in reference beam angle. In this manner, a large number (e.g. hundreds or thousands) of holograms can be written to the same sub-volume 110, each encoding a large number (e.g. millions) of bits.

FIG. 2A shows a schematic perspective view of an example holographic storage system 200 which incorporates certain principles of the present disclosure. In this particular example, three separate waveguides 204, 206 and 208 are used to carry the input beam 104, the reference beams 116, 126 and the output beam 118, and may be individually referred to as the input waveguide 204, the reference waveguide 206 and the output waveguide 208. As noted, the terms "optical waveguide" and "light pipe" are used interchangeably herein. Each of the waveguides 204, 206 and 208 provides spatial multiplexing in the sense that it can guide a signal to (in the case of the input and reference waveguides 204, 206) or from (in the case of output waveguide 208) any one of multiple sub-volumes within the holographic recording medium 102. This provides spatial multiplexing across the volume of the holographic recording medium 102 without requiring any mechanical movement of any of the waveguides 204, 206, 208 relative to the holographic recording medium 102. In order to avoid the need for such mechanical movement, guiding elements are located on or within each of the waveguides 204, 206, 208 and are configurable to change the optical properties of the waveguides 204, 206, 208 so as to guide signals to or from different sub-volumes of the medium 102. That is, to create different channels within the waveguides 204, 206, 208 as needed. In this particular example, the guiding elements take the form of active optical switching elements (switches). There are various forms the switches can take. In this example, the switches take the form of SBGs located in different surface regions of the waveguides 204, 206, 208, in the same general arrangement as FIGS. 3A-E. That is, the waveguides 204, 206 and 208 each take the form of active light pipes, and each of the waveguides 204, 206, 208 has the same general physical structure as the active light pipe 300 of FIGS. 3A-E.

Each waveguide 204, 206, 208 is arranged with its first surface (i.e. the surface on which its SBGs are located) adjacent a different side surface of the medium 102, such that its SBGs extend along that side surface of the medium 102. First and second SBGs of each waveguide 204, 206, 208 are denoted by reference numerals 204-1, 204-2; 206-1, 206-2; and 208-1, 208-2 respectively, all of which are configurable in the manner described above. Further SBGs are depicted without reference numerals, and the number of SBGs can be chosen to accommodate any size of holographic recording medium 102. The following description refers to the first and second SBGs of each waveguide 204, 206, 208 for conciseness but it will be appreciated that the description applies to a greater number of SBGs.

FIGS. 2B to 2D show how the input and reference waveguides 204, 206 are used to write data to the medium 102 in a one-to-many fashion. FIG. 2B shows a schematic plan view of the system 200 and FIGS. 2C and 2D show alternate side views, in which the input and reference waveguides 204, 206 are visible respectively. The input waveguide 404 is used to guide the input beam 104 to any one of multiple sub-volumes of the medium 102 via any one of the SBGs 404-1, 404-2 of the input waveguide 204 in the manner described above. The reference waveguide 406 is configured to guide the reference beam 106 to the same sub-volume simultaneously in order to create the desired interference pattern to be written to that sub-volume. In the depicted examples, both the input and reference waveguides 204, 206 are currently configured to guide the input and reference beams 104, 106 to the sub-volume denoted by reference numeral 110, via the second SBGs 204-2, 206-2 of each waveguide 204, 206.

FIGS. 2E to 2G show how the reference and output waveguides 206, 208 may be used to read data from the medium 102. FIG. 2E is a plan view and FIGS. 2F and 2G show alternate side views in which the reference and output waveguides 204, 206 are visible. The reference waveguide 206 is used in exactly the same way as depicted in FIGS. 2B to 2D, but now to guide the reference beam 116 to any sub-volume from which a hologram is to be read—the sub-volume 110 in this case. The output waveguide 208 is used in a one-to-many fashion to guide the resulting output beam 108 from the sub-volume 110 and through the through waveguide 208 for subsequent detection.

Each sub-volume 110 could for example have a height and width of a few millimetres as measured along any of the side surfaces, and this would generally be sufficient to store several million pixels per data "page" (e.g. multiplexing angle)—in which case, the sub-volume volume is sufficient to store (millions of pixels)*(#multiplexing angles).

The guiding elements of the input waveguide 204 and reference waveguide 206 (the SBGs in this example) are configured as needed to provide channels for the input beam 104 and reference beams 106, 116 from a beam source (emission system) to the sub-volume 108 to be read to. With SBGs, this is a case of setting the SBGs to transmissive or reflective states as needed to create the channel. Similarly, the guiding elements of the output waveguide 208 (also SBGs in this example) are similarly set to provide a channel from the sub-volume 108 being read from to a detector. In order to provide additional context, this is described in more detail below with reference to a multi-waveguide network depicted in FIG. 5. However, the principles described in relation to the specific example FIG. 5 apply more generally to other waveguide network topologies, both simpler networks (e.g. a single waveguide) or more complex waveguide networks.

As set out above, this allows spatial multiplexing over the medium 102, without any mechanical movement of the medium 102 relative to the waveguides 204, 206, 208. This is true whatever form the guiding elements take (the guiding elements themselves could be mechanical or non-mechanical, as noted above).

Holographic Storage Using Multi-Waveguide Networks

Figure 5:
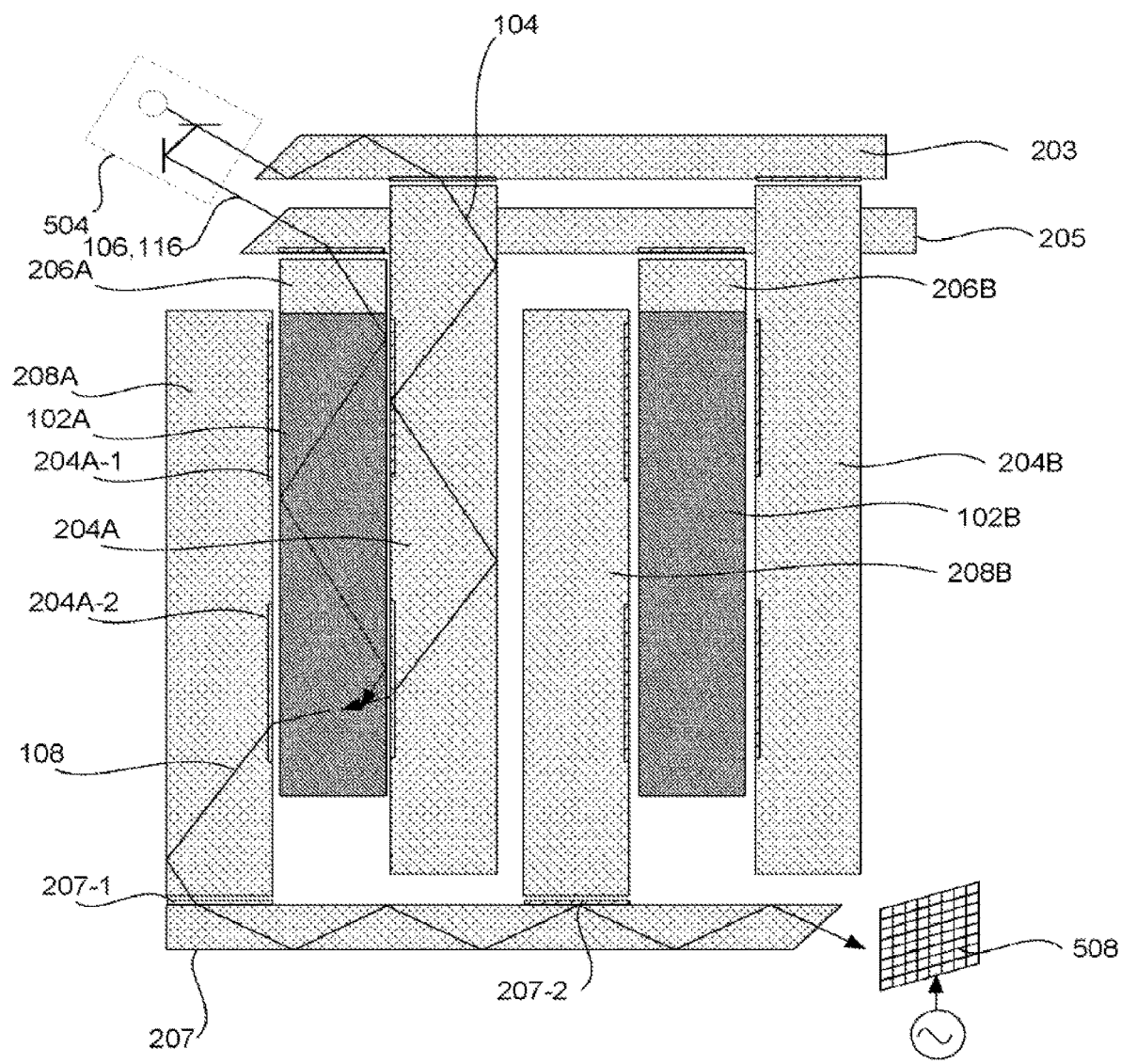
FIG. 5 shows a schematic view of an example of multi-waveguide network used for multiplexing over multiple pieces of holographic storage media.

FIG. 5 shows an example of a holographic storage system incorporating multi-waveguide networks of the kind shown in FIG. 4.

An input waveguide network is shown to comprise a first input light pipe 203 (a "parent" waveguide) to which multiple second input light pipes 204A, 204B ("child" waveguides) are coupled. An input beam 104 from an emitter system 504 is coupled into the first input waveguide 203 via an in-coupling region thereof, and can be guided from there into any of the second input waveguides 204A, 204B.

A reference waveguide network is shown to comprise a first reference waveguide 205 to which multiple second reference waveguides 206A, 206B are coupled. A reference beam 106, 116 from the emitter system 504 is similarly coupled into the first reference waveguide 205, and can be guided to any of the second reference waveguides 206A, 206B.

An output waveguide network is shown to comprise a first output waveguide 207 to which multiple second output waveguides 208A, 208B are coupled.

The depicted arrangement allows beams to be directed to/from different sub-volumes of multiple pieces of holographic storage media 102A, 102B.

Although FIG. 4 shows an input beam 104, reference beams 106, 116 and the output beam 108, it will be appreciated that a sub-volume would typically be written to and read from at different times, in the manner described above with reference to FIGS. 2A-G.

A first group of the second waveguides 204A, 204B, 204C (one each of input, reference and output) are located around the first piece of holographic storage media 102A (first medium), and a second group of the second waveguides 204B, 206B, 208B are located around the second piece 102B (second medium), each in the same general arrangement as FIGS. 2A-G. Hence, input and reference beams 104, 106, 116 can be directed to any-sub volume of any piece of media 102A, 102B by first guiding those beams to the desired second waveguide of the input and reference networks respectively, and then to the desired sub-volume of the piece of media adjacent the desired waveguide.

The output waveguide network can be used to guide an output beam 108 from any sub-volume of any piece of media 102A, 102B from the applicable second output waveguide 208A, 208B into the first output waveguide 207, and from there to a detector via an out-coupling region of the first output waveguide 207 a detector 508. In order to read from a specific sub-volume, the SBGs are configured to provide a channel from that sub-volume to the detector; so, in this case, SBGs 204A-2 and 207A-1 are set to transmissive states and other SBG(s) of the output waveguide network are set to reflective states as needed to provide a channel for the output beam 108 to the detector 508 (e.g. in this case, SBG 207-2 of the first output waveguide 207 is set to reflective to prevent propagation of the output beam 104 into waveguide 207-2). Other SBGs of the output waveguide network can be set to reflective to the extent needed to prevent transmission of any unwanted light, i.e. "leakage" from other regions of the same piece of media 102A or from different piece(s) of media 102B (e.g., in this example, SBG 204A-1 near to the sub-volume being read from is shown set to reflective to prevent unwanted leakage).

Whilst in the above examples, three separate waveguide networks are used for the input, reference and output beams 104, 106, 116, 108, this is not necessarily required. For example, the same waveguide network could be used to carry both the input beam 104 and the reference beams 106, 116 and/or the same waveguide network could be used to carry the input beam 104 and the output beam 108 and/or the same waveguide network could be used to carry the output beam 108 and the input beam 104. It is generally expected that having three separate networks will provide optimal performance, but there are nevertheless perfectly viable implementations using one or two waveguide networks only.

Although not depicted in any of the figures, a fourth waveguide network could be used to carry beams to the remaining side surfaces of the pieces of media 108A, 108B. For example, a fourth network could be used to carry an erase beam to a desired sub-volume, suitable for erasing at least hologram therefrom (in the case of erasable holographic storage).

Figure 9:
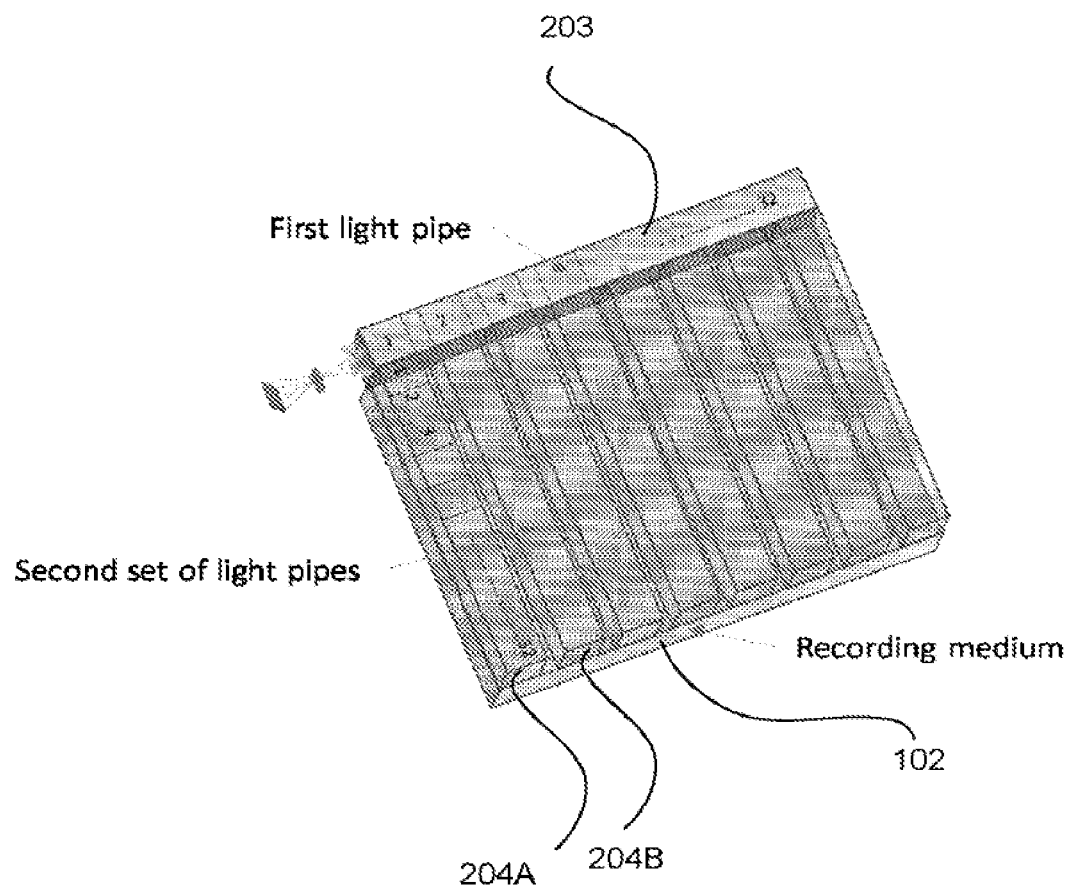
FIG. 9 shows an alternative holographic storage system, in which at least one waveguide network is used to spatially multiplex over a slab of holographic recording media in two dimensions.

FIG. 9 shows an alternative physical structure, where a single "slab" of holographic media 102 is used in place of the individual pieces 102A, 102B of FIG. 5. An input waveguide network is depicted, and has the essentially the same physical configuration, but with the second input waveguides 204A, 204B now configured to guide an input beam 104 to different sub-volumes of the same slab 102. Whereas in FIG. 5, each second input waveguide 204A, 204B provides multiplexing in a single dimension, along the length of a different single piece of media 102A, 102B, in FIG. 9, the second waveguides 204A, 204B provide spatial multiplexing in two dimensions over the slab of holographic medium 102 (each waveguide individually provides one-dimensional multiplexing, but there is 2D multiplexing over the slab 102 as a whole).

The system of FIG. 9 is limited to a maximum of two waveguide networks (one on each side of the slab 102). As noted above, this is nonetheless a viable arrangement because it is possible to use the same network to carry multiple beams.

Data Encoding

Figure 6A:
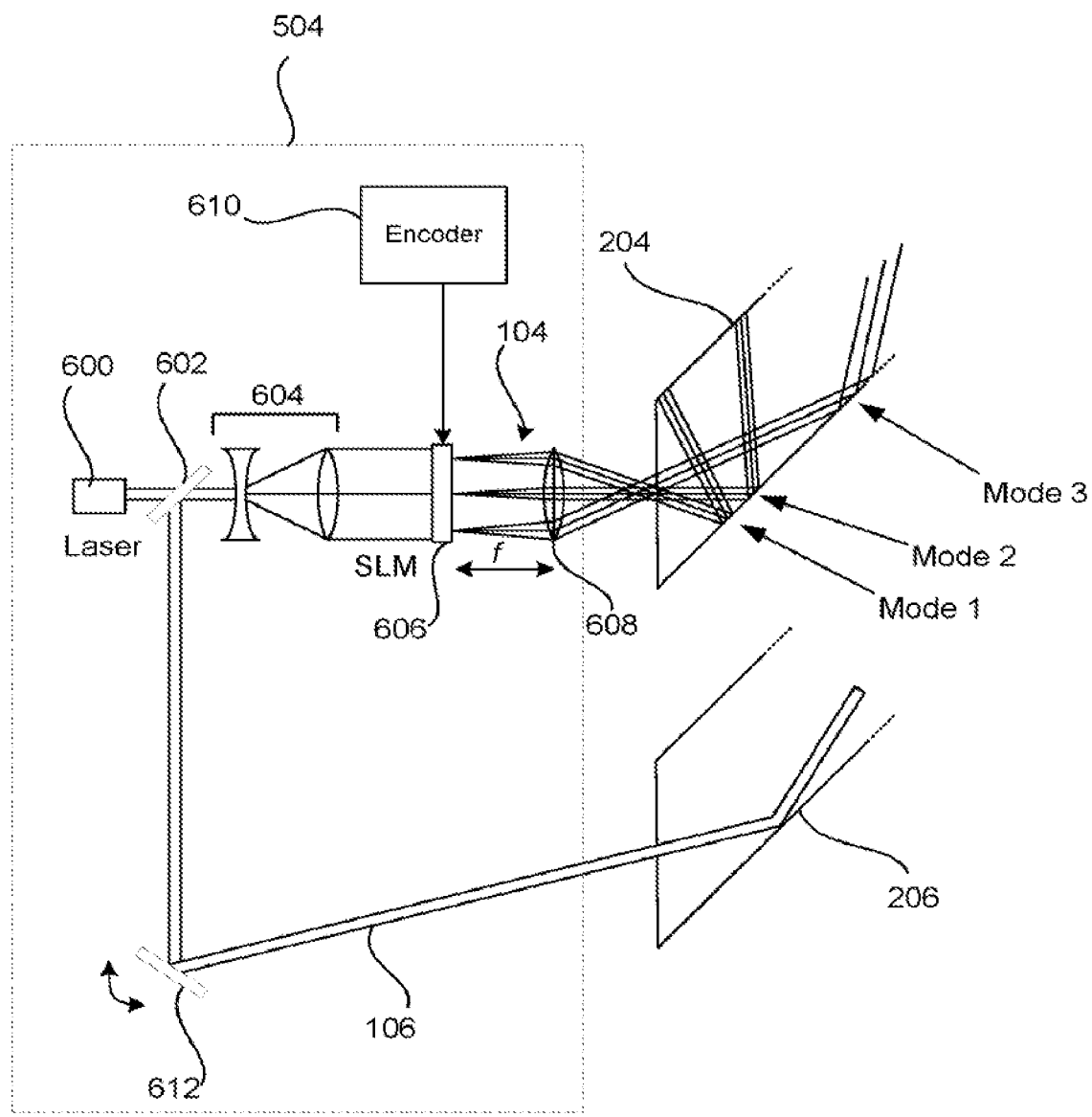
FIG. 6A shows an example of an emission system for providing input and reference beams in a holographic storage system.

FIG. 6A shows an example of an emitter system 504 which provides both an input beam 104 and a reference beam 106. The input beam is an expanded, spatially modulated laser beam. A laser 600 emits a coherent, narrow laser beam, which is split using a beam splitter 604.

One part of the beam from the beam splitter 602 is used as the reference beam 106. In this example, a controllable reference beam steering element 612 is used to steer the reference beam 106 into a reference waveguide 106 at a desired angle. By changing the angle of the reference beam 106 before it is coupled into the reference waveguide 206, different holograms can be written to/read from the same sub-volume of media in the manner described above.

Alternatively or in addition to beam angle multiplexing, multiple patterns may be stored to and read from the same sub-volume with different phases of the reference beam 106, 116 (phase multiplexing). Thus, a logical address may correspond to a particular reference beam angle and/or phase characteristic. All description pertaining to the modulation of reference beam angle applies equally to phase modulation.

The other part of the beam from the beam splitter 602 is expanded using a beam expander 604 and the expanded beam passes through a spatial light modulator (SLM) 606. An encoder 610 receives a set of data to be encoded and encodes it as a digital image that is then modulated into the expanded beam via the SLM 606. In-coupling optics—in this case, a Fourier lens 608 located such that the plane of the SLM 606 lies substantially in the focal plane of the Fourier lens 608—is used to separate the expanded beam into distinct modes of propagation; a mode corresponding to a unique direction of propagation in this example, with each mode now corresponding to a particular point in the plane of the SLM 606. The different propagation modes are coupled into an input waveguide 202, through which they are guided in the manner described above. With the in-coupling optics 608, data is "angularly encoded" within the reference beam, in the sense that points within the digital image essentially correspond to unique directions of propagation, i.e. unique propagation modes of the input beam 104. This is analogous to the rays from a distant object taken to be at infinity. The angularly encoded input beam 104 of FIG. 6A is one example of a "multimode" optical signal multiple propagation modes (i.e. components propagating in different directions) and this arrangement provides a form of angular diversity.

Figure 6B:
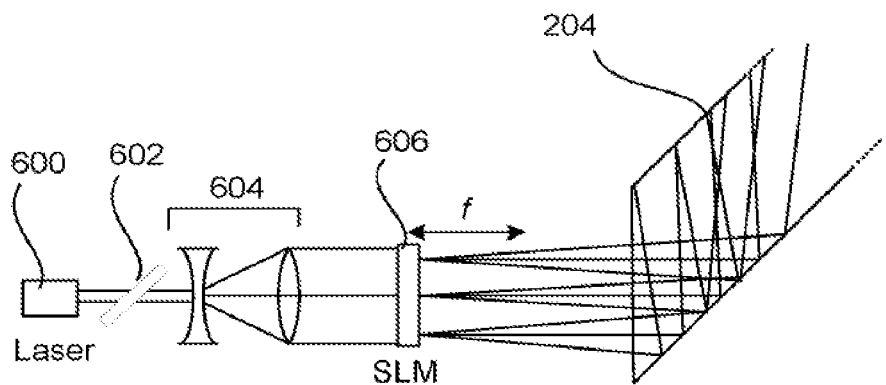
FIG. 6B shows a variation of the emission system with simplified optics.

Note the term "multimode" does not necessarily imply the use of such in-coupling optics 608, nor does it require that every image point uniquely corresponds to a given direction of propagation. That is, multimode does not necessarily imply a one-to-one correspondence between propagation modes and image points/data points. For example, FIG. 6B shows an alternative viable emitter system in which the spatially modulated beam is coupled directly into the input waveguide 204. In this case, there are still multiple modes (i.e. multiple spatial paths through the waveguide for any given channel), but without the one-to-one correspondence between directions of propagation and image points, and possibly without any one-to-one correspondence between image/data points and modes. This provides a form of spatial diversity based on a form of MIMO (multiple input multiple output) transfer, via the multiple pixels of the SLM 606 and the detector array of the spatially coherent detector 508.

Data Decoding

Figure 7:
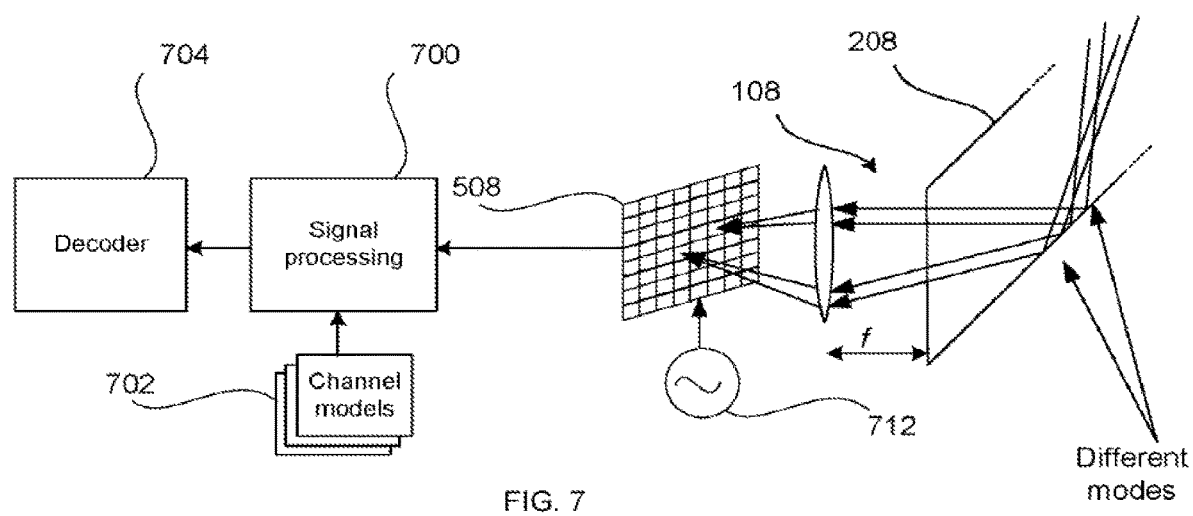
FIG. 7 shows an example of a data retrieval system that uses spatial coherent detection to measure the optical field of an output beam and signal processing to mitigate waveguide distortion in the measured optical field.

FIG. 7 shows a spatial coherent detector 508 used for measuring the optical field of the output beam 108. In contrast to conventional "direct detection", the spatial coherent detector 508 comprises an array of pixels (or, more generally, detector elements) each of which is configured to measure both an amplitude and a phase of an optical field at a location of that pixel (and not simply the intensity). These may be measured e.g. using a local oscillator 712 of the spatial coherent detector 508. The array of pixels is thus able to measure variations in the phase and amplitude of the optical field in both time and space, and thus provide an analogue or digital representation of the measured optical field. In this case, the measured optical field is an optical field of an output beam 108 guided to the spatial coherent detector 208 via an output waveguide 208.

Although only a single array is depicted, there could in fact be multiple physical arrays that cooperate as a single "logical array". For example, this logical array may be split over two physical cameras.

A physical detector array could take the form of a single camera (with each detector element being a pixel or a set of pixels of the camera), or multiple cameras. In the extreme case, each detector element could be a separate camera, and in that case the logical detector array may potentially be split over very many physical detectors.

As noted, a route from a specific in-coupling region at which a beam enters a waveguide network to a specific outcoupling region at which it exits the waveguide network (where those regions could be in the same or different waveguides) may be referred to herein as a "channel". As noted, in a multimode waveguide network, a single channel will encompass multiple spatial paths. The output beam 108 will have been guided via a specific channel of an output waveguide network, i.e. from a specific in-coupling region thereof to the out-coupling region of the output waveguide 208. Moreover, it will have been generated from a hologram that was created using an input beam guided from the in-coupling region of an input waveguide network to a specific out-coupling region thereof. The hologram will have been created and read using reference beams similarly guided via specific channels through a reference waveguide network. The input beam 104, reference beams 106, 116 and output beam 108 are all susceptible to distortion within the relevant waveguide network that is specific to the channels via which they have been guided. A signal processing component 700 applies analogue and/or digital signal processing to the representation of the measured field in order to compensate for such distortion; it does so using a channel model associated with the sub-volume currently being read from (i.e. from which the output beam 108 was produced). The channel model associated with a particular sub-volume will model not only the channel via which the output beam 108 has been guided to the detector 508, but also the channels via which the input beam 104 used to write the hologram was guided to that sub-volume, and the channel via which the reference beams 106, 116 used to write to/read the hologram were guided to that sub-volume.

Each channel model could for example take the form of a transfer function (directly modelling the channel) or an inverse transfer function (modelling the channel in terms of its approximate inverse). Note that the transfer function is applied to the representation of the measured optical field, i.e. both its measured phase and amplitude at different spatial points, and not simply the intensity of the light. Spatial coherent detection provides greater scope for removing or reducing such channel distortion, the aim being to recover the original digital image sufficiently accurately to facilitate decoding of the encoded data from the recovered image by a decoder 704.

The signal processing 700 could, for example, correct for phase interference and noise using a combination of optical and computation techniques, which may, for example, include machine learning techniques.

Although described in the context of holographic storage, the use of such signal processing 700 in combination with spatial coherent detection is not limited in this respect, and can be applied in other contexts such as optical communication or optical computation, or any other context in which a received output beam is susceptible to distortion introduced in one or more waveguide networks.

FIG. 7 shows out-coupling optics 715 arranged to essentially reverse the effect of the in-coupling optics 608 of FIG. 6B, i.e. to resolve each propagation mode to essentially a single point within the plane of the spatial coherent detector 508. Again, this is not essential, and with the alternative emission system of FIG. 6B, the out-coupling optics 715 could be omitted.

Although not depicted in FIG. 6A or 6B, some level of pre-processing may be applied to the digital image before it is modulated into the input beam 104. This may reduce the level of compensation needed at the detector side. Even with such pre-processing, some amount of detector side processing may be applied, to account different distortion effects between different channels.

Dynamic Scheduling

Figure 8A:
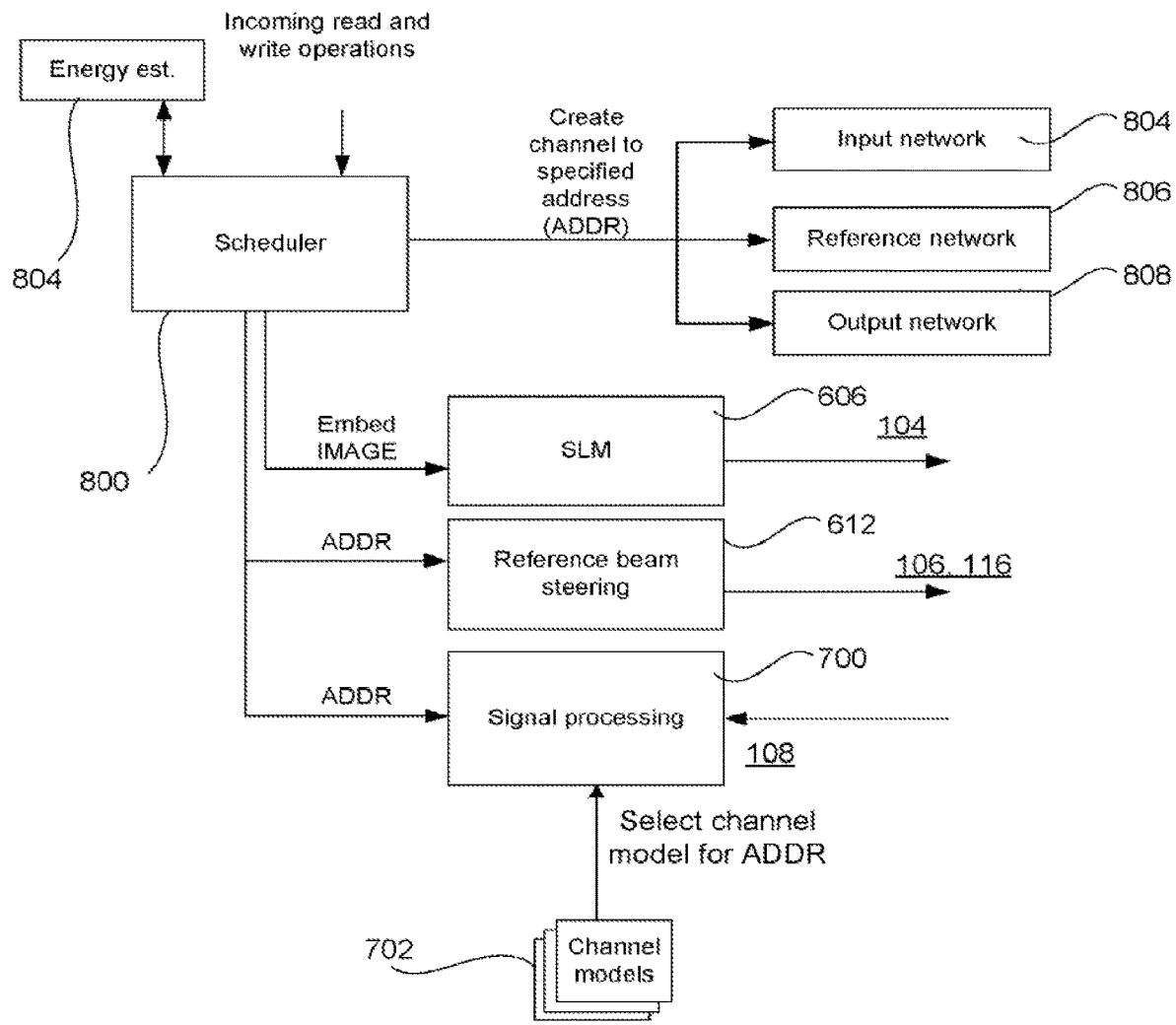
FIG. 8A shows a function block diagram denoting functions performed within a holographic storage system.

FIG. 8A shows a controller, in the form of a scheduler 800 which can schedule read and write operations within a holographic storage system of the kind described above. To facilitate effective scheduling, sub-volumes within the media 108, or within each piece of media 108A, 108B, are assigned unique addresses. This provides a form of addressable holographic storage, analogous to more conventional forms of addressable electronic storage. However, there are a number of distinctions over conventional addressing.

Firstly, as described above, a single sub-volume can store multiple holograms at different reference beam angles. To accommodate this, each address uniquely corresponds to a specific sub-volume in combination with a specific reference beam direction, i.e. each available tuple is assigned a unique address, where denoted a specific sub-volume within the medium 102 or one of the pieces of media 102A, 102B and denotes a particular reference beam direction (e.g. an angle or set of multiple angles defining the beam direction; the term "angle" may be used as shorthand to refer to the direction of the reference beam, though it will be appreciated that the direction may in fact be defined by multiple angles depending on the configuration of the system). Hence, a sub-volume may be associated with a potentially large number of addresses, corresponding to different reference beam angles. The tuple defines a logical storage location where multiple logical storage locations are provided, at the physical level, by the same sub-volume at different reference beam angles. Each logical storage location has a unique address (ADDR). The notation is used as shorthand to mean address corresponding to sub-volume and reference beam angle, though it will be appreciated that this does not imply any particular representation of the address. Any address space and addressing mechanism that uniquely identifies logical storage locations of this nature can be used.

Secondly, in contrast to conventional storage, each logical storage location can store an entire image, and hence a single logical storage location can potentially store a very large number (e.g. thousands or millions) of bits.

The scheduler 800 operates at the logical storage level and schedules income read and write operations pertaining to different addresses within appropriate time intervals.

Reference numerals 804, 806 and 808 are used to denote input, reference and output optical waveguide networks respectively. As noted above, each be a single-waveguide network or multi-waveguide network (e.g. as in FIG. 5), with one or more configurable guiding elements (e.g. SBGs or other active switching elements) which can be used to create channels to different sub-volumes of a piece (or pieces) of holographic storage media.

During an interval in which a write operation pertaining to a particular address is scheduled (write interval), the guiding elements within the input and reference waveguide networks 804, 806 are set to create a channel for the input beam 104 and reference beam 106 from the emitter system 504 through the input and reference networks 804, 806 respectively to the corresponding sub-volume; additionally, the reference beam steering element 612 is set to direct the reference beam 106 into the reference network 806 in the corresponding direction. This causes the desired interference pattern to be created within sub-volume at reference beam angle, which in turn causes that interference pattern to be persistently stored as a hologram provided the sub-volume is exposed to the interference pattern for a sufficiently long duration.

During an interval in which a read operation pertaining to a particular address is scheduled (write interval), the guiding elements within the reference and output networks 806, 808 are similarly set to create a channel for the reference beam 116 through the reference network 806 to the sub-volume and to create channel for the output beam 108 through the output network 808 from the sub-volume to the detector 508; the reference beam steering element 612 is similarly set to direct the reference beam 116 into the reference network 806 in the corresponding direction, in order to read the intended hologram at sub-volume and reference beam angle.

Optimal Scheduling

One issue with holographic storage is that write operations take a relatively long time to complete. This is because, in order to create a stable (persistent) hologram, a sub-volume needs to be exposed to a relatively long time interval, as compared with the time needed to read an existing hologram. For example, an exposure time of the order of ten or a hundred milliseconds may be needed to persistently create a hologram in certain systems. By contrast, a read operation only requires the sub-volume to be exposed long enough to measure the resulting optical field of the output beam 108. For example, an exposure time for a read operation (i.e. the duration of media exposure to read beam and/or camera shutter open time) of the order of a hundred microseconds to one millisecond might be realized in certain systems, and a write operation could, for example, be segmented over intervals of similar duration.

However, it is recognized herein that it is not necessary to perform a write operation in a single, unbroken time interval. Providing a sub-volume is exposed to the interference pattern for sufficient total, aggregate time, that exposure can be performed in a "staged" fashion. To perform a write operation, the sub-volume can exposed to the interference pattern to be recorded for an amount of time that is insufficient to cause that interference pattern to be persistently recorded. The exposure can then terminate in order to perform some other operation, and re-commenced at a later time. The time between write intervals can be arbitrarily long in general, assuming the data can be held elsewhere in the interim (e.g. in a non-volatile buffer), as the data in the hologram may not be readable from the media until the full exposure is finished. However, this could result in significant write latency. Therefore, the scheduler 800 seeks to balance the amount of such buffering needed with the need to avoid head-of-line blocking for reads.

Figure 8B:
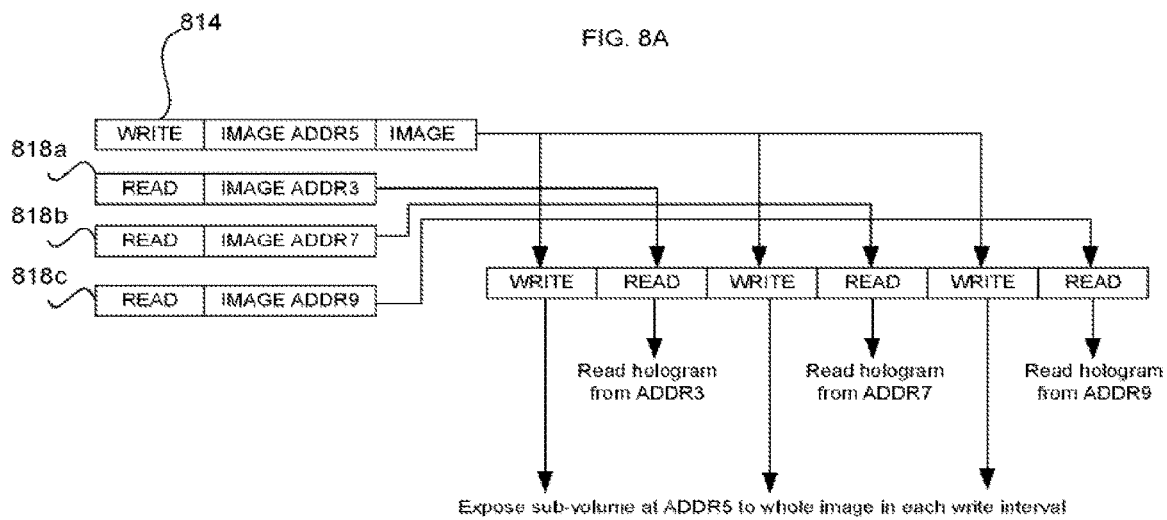
FIG. 8B schematically illustrates a scheduling scheme for performing write operations in a staged fashion.

FIG. 8B schematically illustrates a scheduling scheme that leverages this effect to efficiently schedule a set of read and write operations. For the purposes of illustration, a single write operation 814 and three read operations 818a, 818b, 818c are depicted, but the scheduling scheme can be applied to any number of read and write operations.

As well as energy efficiency, an additional benefit of staggering write operations is that it allows read operations to be scheduled in a way that reduces the "head-of-the-line blocking" that write operations might otherwise have in a "naïve" scheduling scheme that simply schedule the write operation in a time interval sufficiently long for it to complete, and then perform the read operations once the write operation has completed. The latter is how write operations are typically scheduled in conventional storage systems. In such systems, write operations have the effect of significantly increasing the latency of the read operations 818a-c that would have to wait until the write operation 814 has completed.

By performing the write operations 814 in a staged fashion, across multiple non-contiguous time intervals, with the read operations 181a-c scheduled in read intervals interleaved in time with the multiple write intervals, the dual effects of increased energy efficiency and reduced read operation latency are achieved.

In each write interval, the sub-volume to which the write operation 814 pertains is exposed to the same interference pattern that encoded the image to be stored; the input and reference networks 804, 806 are configured in the same way in each write interval to provide the necessary channels, and the reference beam 106 is directed in the same direction.

In the intervening read intervals, the reference and output network 806, 808 can be reconfigured and the reference beam 116 can be redirected as desired to read any desired hologram within the holographic storage system.

Energy Optimization

Surprisingly, it has been found that, when write operations are staged in the manner described above, the total, aggregate time (i.e. the sum of the individual durations of the multiple non-contiguous write intervals) needed to persistently create a hologram is less than the exposure time that would be required to write the hologram in a single, unbroken write interval for a given power of the input and reference beams 104, 106. For example, it has been found that a write operation that might take about 10 ms to complete in a single, unbroken write interval could be performed in the same system over multiple, non-contiguous time intervals having a total, aggregate duration of only about 7 ms. This, in turn, means the amount of energy needed to complete a write operation (which is essentially directly proportional to the total duration needed to complete it with beams of fixed power) can be reduced by staging the write operation in the manner of FIG. 8B.

Figure 13:
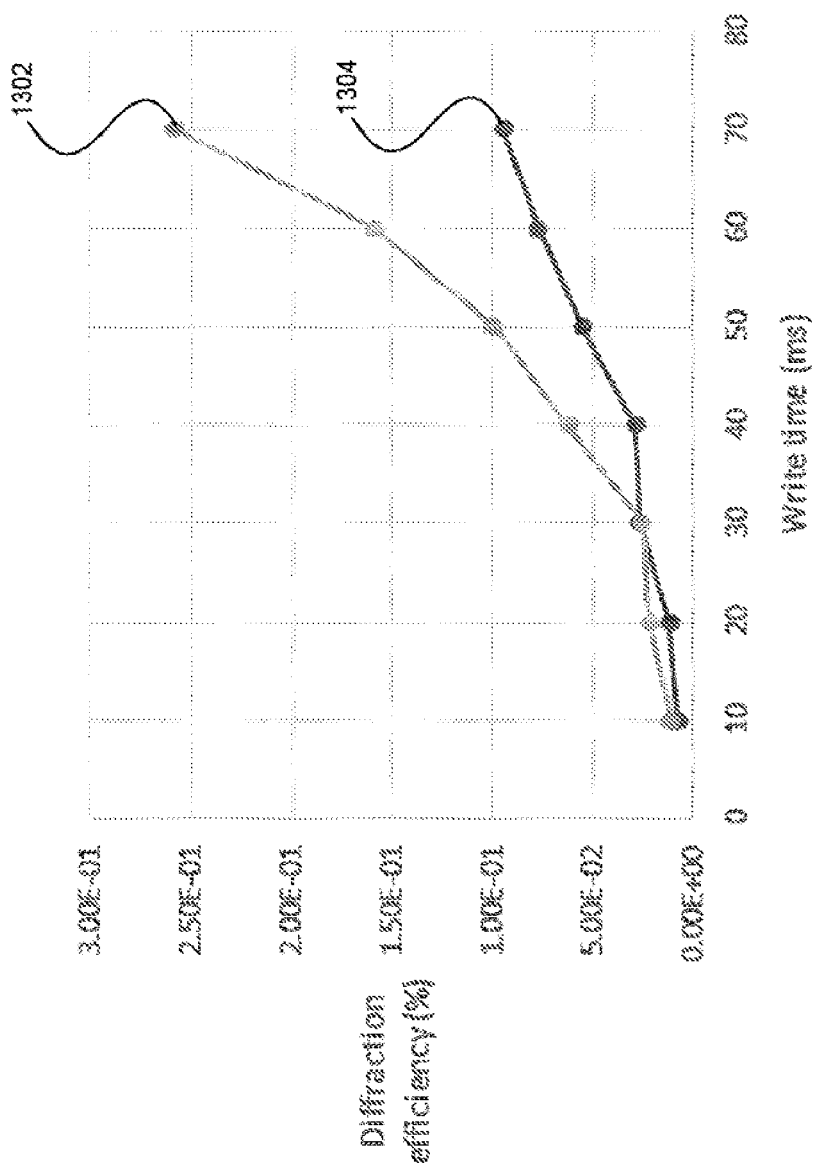
FIG. 13 shows a graph of diffraction efficiency results against write time for pulse and continuous write modes.

FIG. 13 shows a set of results that illustrate this effect, for one particular set up. Results for pulse and continuous writes are denoted by reference numerals 1302 and 1304 respectively. In this particular example, it can be seen that, for each write time above about 30 ms, a higher diffraction efficiency is achieved for pulse writes having a total, aggregate duration of that amount than a continuous write having the same total duration. Diffraction efficiency can be seen to increase with write time. In this context, diffraction efficiency indicts total energy diffracted into the medium 102, in proportion to incident energy. Hence, greater energy efficiency can be seen to be achieved with pulse writes versus continuous writes.

FIG. 8A shows an energy estimation function 804 which can be used to estimate an amount of energy needed to perform a set of operations according to a particular schedule, taking into account the effect described above. The scheduler 800 attempts to determine a substantially optimal schedule that substantially minimizes the total estimated energy required energy to complete a given set of operations. That aim is entirely compatible with the aim of mitigating the head-of-the-line blocking effect of write operations; staging a write operation 814 in the above manner will not only free up intervening time intervals to allow read operations 818a-c to be completed with lower latency in the intervening read intervals, but will also reduce the total amount of energy required to complete the write operation 814 for the reasons discussed in the previous paragraph.

The scheduling can be dynamic in the sense that a write operation 814 may be interrupted dynamically in response to an incoming read operation(s) 818a, 818b, 818c instigated or received after the write operation 814 has commenced, but before it has completed. This ability to interrupt a write operation 814 dynamically allows the scheduler 800 to respond to incoming read operations with minimal latency.

Cost Function-Based Scheduling:

One possible scheduling scheme based on cost function optimization will now be described. In this case, the scheduler 800 seeks to optimize a defined cost function, which seeks to balance competing factors such as two or more of write latency, read latency (e.g. expressed in terms of read buffering time) and energy (taking into account the energy reduction effect from staging write operations).

For example, given a set of read operation(s) R={$r_i$} and a set of write operations W={$w_j$}, and a schedule S that schedules these operations in a particular way across (i.e. assigns each operation to one or more time intervals, which could include non-contiguous time intervals for a write operation), a cost function could be defined as:

$$C(S) = W_1 \sum_i L_S(r_i) + W_2 \sum_j L_S(w_j) + W_3 \sum_j E_S(w_j)$$

where:
The first term $L_S(r_i)$ is the estimated latency for read operation $r_i$ given the schedule S. More generally, the first term could be any read latency penalty.
The second term $L_S(w_j)$ is the estimated latency for write operation w; given the schedule S. More generally, the second term could be any write latency penalty.
The third term $E_S(w_j)$ is the estimated energy needed to complete write operation $w_j$ given the schedule S, where the energy estimation function $E_S$ takes into account the energy reduction effect from "staggering" the write operation. More generally, the third term could be any energy penalty (i.e. which penalizes increased in the required energy). Here, $E_S$ represents the energy estimation function 804.

$W_1$, $W_2$, $W_3$ are weights—e.g. the first term might have a higher weight to penalize read latency more than write latency.

Whilst this cost function considers three competing factors, there could be any number of cost terms (e.g. any two of the above and/or other cost terms).

With the second and third terms, staggering a write operation might decrease the associated energy penalty in the third term, but increase the latency penalty in the second term. The optimizer would try to find an optimal schedule S* that balances these competing requirements:

$$S^* = \mathrm{argmin}_S C(S)$$

That is, a schedule S* with a substantially minimized cost.

Whilst the above uses the "cost" terminology, this is merely a convenient label. Optimizing a reward function (that rewards reductions in e.g. latency and/or energy) is synonymous with minimizing a cost function herein.

Figure 10A:
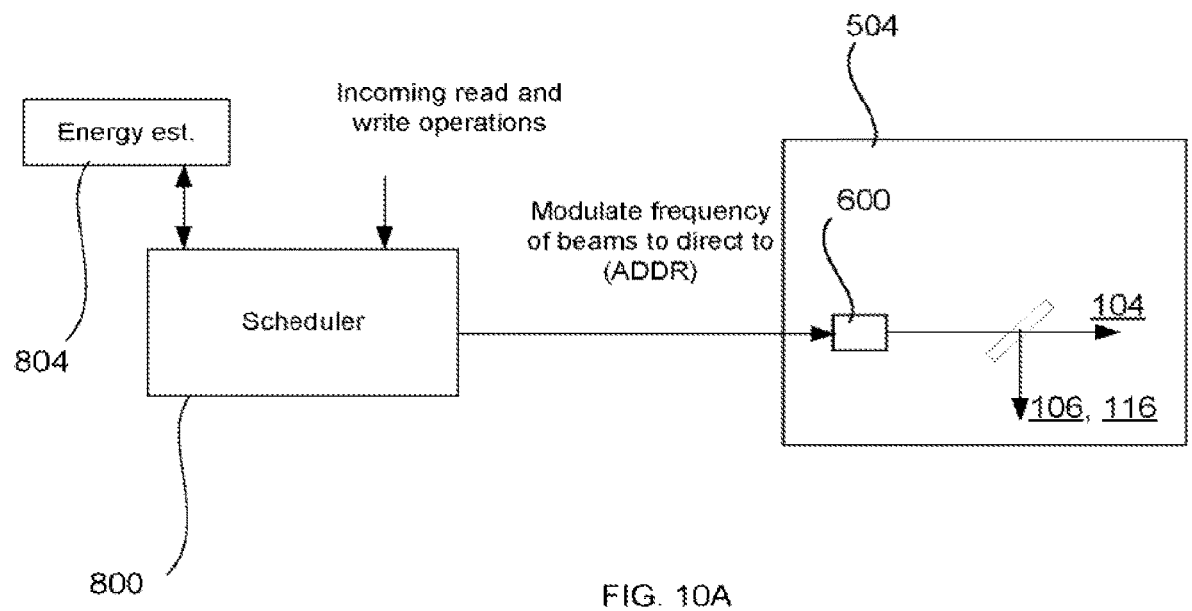
FIGS. 10A and 10B show how spatial multiplexing may be achieved with passive guiding elements, where spatial multiplexing is achieved by modulating beam characteristic(s)
Figure 10B:
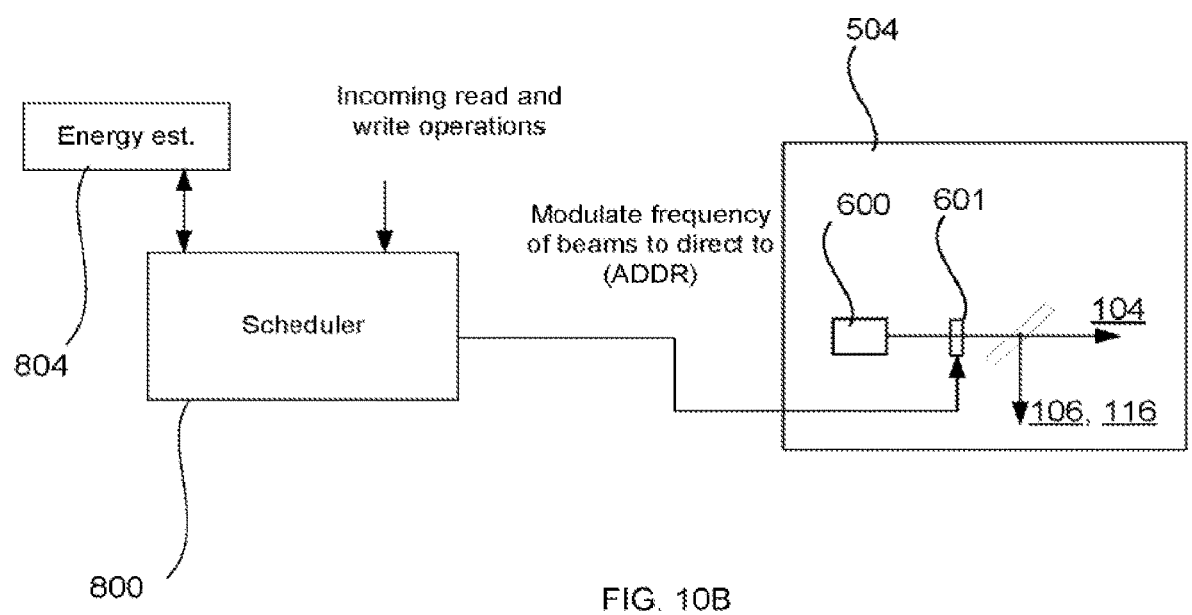

Alternative Waveguide Network:

FIGS. 10A and 10B shows alternative systems, in which spatial multiplexing is instead achieved by modulating one or more optical characteristics of the input and reference beams 104, 106, 116. In such a system, passive (non-switchable) guiding elements may be used in place of the active (switchable) guiding elements of the earlier figures.

The example of FIG. 10A considers frequency (or, equivalently, wavelength) modulation. In this case, the light pipe(s) itself (themselves) could be passive, with static wavelength-dependent outcoupling (such as successively longer-pass dichroic interference filters, or varying centre wavelength bandpass filters).

FIG. 11A shows a light pipe 1100 having an outer surface 1100-S, along which multiple passive filters 1100-1, 1100-2 lie. The configuration of the light pipe 1100 is the same as that of FIGS. 3A-D, aside form the fact that the filters 1100-1, 1100-2 replace the SGBs 300-1, 300-2. The filters 1100-1, 1100-2 have different frequency responses (i.e. they act as frequency filters). More specifically, each filter 1100-1, 1100-2 is essentially transmissive to a relatively narrow range of optical frequencies, and essentially reflective to frequencies outside of that range. FIG. 11A shows an in-coupled beam 1104 with a frequency within the range of the second filter 1100-2, but outside the range of the first filter 1100-1. Hence, the beam 1104 is reflected from the former, but transmitted through the latter (thus exiting the light pipe 1100 at that location). FIG. 11B shows a beam 1104' of different frequency, now within the range of the first filter 1100-1, which is thus transmitted through the first filter 1100-1.

Such a light pipe 1100 can be used in place of the active light pipes described above, and the above description applies equally with the following modification to the system.

FIG. 10A shows the scheduler 800 communicatively coupled to the laser 600 of the emitter system for varying the frequency (or, equivalently, wavelength) of the input and reference beams 104, 106, 116. In this case, either beam can be directed to a desired holographic storage region by setting the frequency accordingly. Different beam frequencies now correspond to different routes through the waveguide networks (defined by the different frequency characteristics of the passive filters), and the frequency can be set to correspond to any desired route.

In this case, wavelength is used as the switching dimension. The laser 600 is a fast tuneable laser that functions as an active element.

In such a realisation, switching could be in one spatial dimension only (i.e. along a single pipe). However, with a laser with sufficient range and line narrowness, a first light pipe could filter coarsely (i.e. over relatively wider wavelength ranges) and subsequent light pipes sample more finely (i.e. over narrower wavelength ranges). Another factor that restricts line with is the desire for a relatively long coherence length, so the line may be sufficiently narrow in any event. To achieve replication of the input field to addressable locations across a 2D output space in a holographic storage context, this implementation could, for example, be combined with a second implementation using a different switchable parameter (e.g. polarisation).

In the context of a read operation, the frequency of the output beam 108 will match that of the reference beam 116 used to read a particular sub-volume, and can be guided back to the detector using suitable filters in the output waveguide network 808, applying the same principles.

FIG. 10B shows an example of such an implementation with a controllable polarization element 601, which can be used to vary the polarization of the input and reference beams 104, 106, 116. This could be combined with passive polarization filters on or within the light pipes. This could be implemented as an alternative or in addition to the passive frequency filters in the example of FIG. 10A. Such polarization modulation would provide two independent routes, and can be usefully combined e.g. with passive wavelength filtering and/or active light pipe(s). Polarization modulation of the beam could also be combined with active polarization filter(s).

Note, all of the various "passive" and "active" implementations described above can be implemented separately or in combination, e.g. a combination of active and passive guiding elements could be used. That is, a waveguide could have both passive and active elements and/or active and passive waveguides could be combined in the same network.

Additional Hierarchical Levels:

The above examples consider waveguide networks with two hierarchical "levels" of parent and child waveguides. However, a multi-waveguide network could have three levels (parent, child, grandchild) or more. Note the terms "child", "parent" and "grandparent" do not necessarily imply direct hierarchical relationships, i.e. the term child or grandchild could refer to any waveguide at any hierarchical level below a parent or child waveguide respectively; that is, a child/grandchild waveguide could be optically coupled to a parent/child waveguide not only via e.g. an air interface (direct descendant) but also via one or more other child/grandchild waveguides thereof (indirect descendent).

Figure 12:
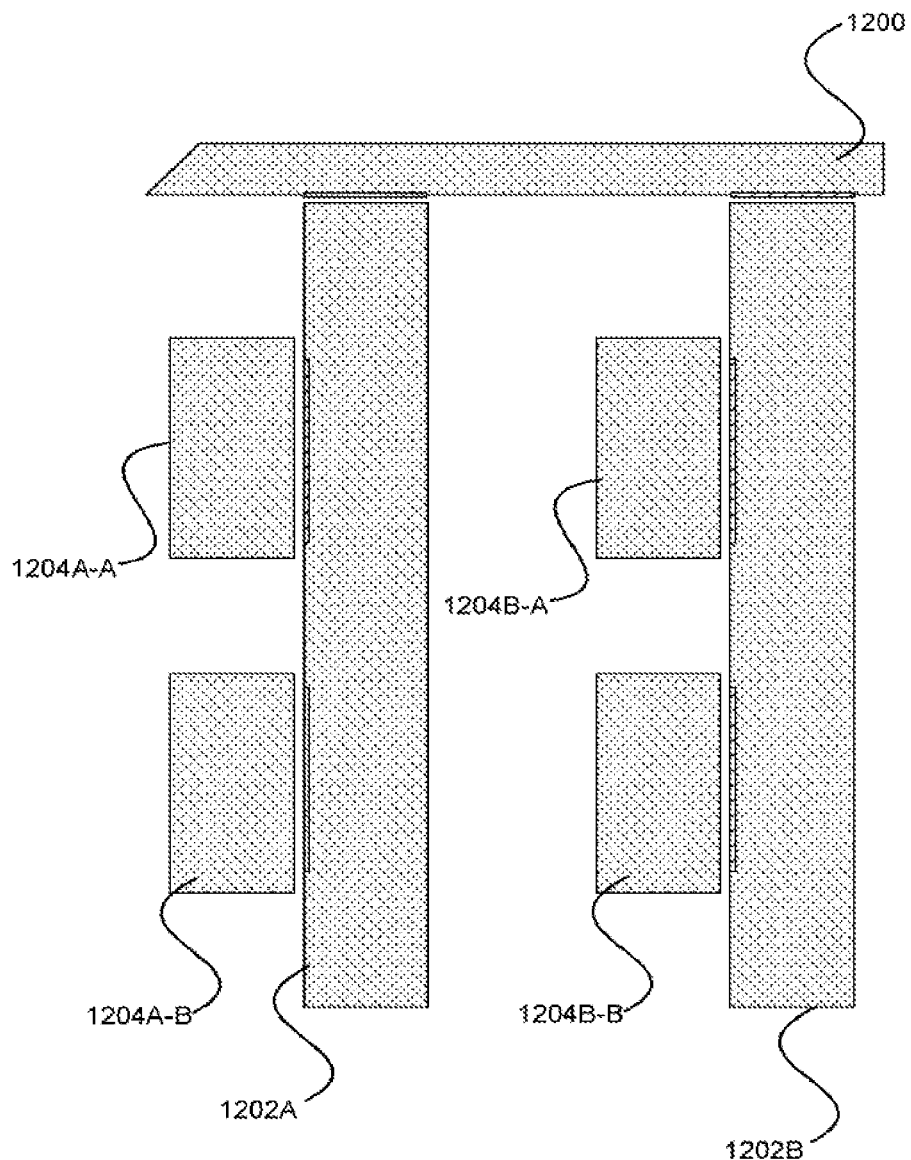
FIG. 12 shows an example of a waveguide network with three hierarchical levels.

FIG. 12 shows an example of a waveguide network with three hierarchical levels. A parent waveguide 1200 has two direct child waveguide networks 1202A, 1202B optically coupled thereto in the above manner, and each of those child waveguides 1202A/1202B has two grandchild networks 1204A-A, 1204A-B/1204B-A, 1204B-B optically coupled thereto in same way.

An extreme example would be a "binary tree" architecture, where every waveguide has exactly two direct children, with a potentially more than three levels of waveguide. However, in practice, there may also be circumstances where it is preferable to increase the number of direct children to reduce the required number of hierarchical levels.

More generally, the described scheduling techniques can be implemented in any holographic storage system (with or without waveguides), with the same energy saving benefits. This includes, for example, systems without spatial multiplexing, or where spatial multiplexing is achieved using mechanical means, such as a moveable medium or a moveable read/write head.

The scheduler 800 and energy estimation functions 804 shown in FIGS. 8A, 10A and 10B are functional components of the system. Similarly, the encoder 610, decoder 704 and signal processing component 700 are functional components. Such components can be implemented in software (i.e. as program code executed on one or more programmable hardware processors, such as CPUs, accelerators, e.g. GPUs etc.), or using other forms of processor hardware such as Field Programmable Gate Array(s) and/or Application Specific Integrated Circuit(s). The signal processing performed by the signal processing component 700 can be analogue or digital signal processing, or any combination thereof. Such program code and other data (e.g. the channel models 702) may be encoded in computer readable storage. Examples of computer readable storage include optical, magnetic and/or solid-state storage, in which code, data and the like may be stored in non-transitory form. This contrasts with a transitory media such as a transient signal carrier.

A first aspect herein provides a method of performing a write operation in a holographic data storage system, the method comprising: scheduling, by a scheduler, at least one write operation across multiple non-contiguous write intervals, the write operation pertaining to a set of data to be stored in a region of a holographic recording medium; and in each of the non-contiguous write intervals, exposing the region of the holographic recording medium to an interference pattern caused by interference between a reference beam and an input beam carrying the set of data; wherein the multiple non-contiguous write intervals have a total aggregate duration of sufficient length to cause a persistent state change in the exposed region, such that the set of data is recoverable from that region by the end of a final write interval of the multiple non-contiguous write intervals.

In embodiments, the scheduling step may further comprises the scheduler scheduling at least one further operation in at least one interval interleaved with the multiple non-contiguous write intervals.

The at least one further operation may comprise at least one read operation.

The at least one further operation may comprise at least one further write operation, which is scheduled across further multiple non-contiguous write intervals interleaved with said multiple non-contiguous write intervals.

The scheduler may use an energy estimation function to perform said scheduling, the energy estimation function for estimating an amount of energy required to complete the at least one write operation.

The scheduler may perform said scheduling by substantially optimizing a cost function that penalizes increases in the estimated amount of energy required to complete the at least one write operation.

The cost function may also penalize increases in an estimated latency for the at least one write operation.

Alternatively or additionally, the cost function may also penalize: increases in an estimated latency for the at least one read operation, and/or increases in an estimated latency for the at least one further white operation and increases in an estimated amount of energy required to complete the at least one further write operation.

The scheduler may schedule at least a later one of the multiple non-contiguous time intervals dynamically, in response to the read operation, at a time during or after an earlier one of the multiple non-contiguous time intervals.

A second aspect herein provides a holographic data storage system comprising: at least one processor configured to implement a scheduler, the scheduler configured to schedule at least one write operation across multiple non-contiguous write intervals, the write operation pertaining to a set of data to be stored in a region of a holographic recording medium; an emitter system configured to emit, in each of the multiple non-contiguous write intervals, a reference beam and an input beam in which the set of data is embedded; and a holographic recording medium, the holographic storage system being arranged to expose a region of the holographic recording medium to an interference pattern caused by interference between the input and reference beams in each of the multiple non-contiguous write intervals, thereby carrying out the scheduled write operation.

The scheduler may be configured to schedule at least one further operation in at least one interval interleaved with the multiple non-contiguous write intervals, wherein the system may further comprise one or more optical waveguide networks arranged to guide the input beam and the reference beams to the region of the holographic recording medium in each of the multiple non-contiguous time intervals, wherein the system may be configured to use at least one of the one or more optical waveguide networks in the interleaving interval to carry the reference beam to: another region of the holographic recording medium or another holographic recording medium, with or without varying an angle and/or phase characteristic of the reference beam, or the same region of the holographic recording medium but at a different angle and/or phase characteristic.

The at least one optical waveguide network may have at least one configurable guiding element, and the at least one processor may be coupled to the at least one guiding element to cause it to be reconfigured in order to carry the reference beam to the other holographic recording region in the interleaving interval.

The at least one optical waveguide network may have at least one static guiding element responsive to a controllable optical characteristic of the reference beam, and the at least one processor may be coupled to the emitter system to cause the optical characteristic of the reference beam to be changed in order to carry the reference beam to the other holographic recording region in the interleaving interval.

The write operation and the further write operation may be associated with respective logical addresses, each logical address defining the holographic storage region and the reference beam angle and/or phase characteristic for its associated operation.

A third aspect herein provides a scheduler embodied as executable program code stored on a computer-readable storage medium and configured, when executed on at least one processor of a holographic data storage system, to carry out any of the above methods.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A method of performing a write operation in a holographic data storage system, the method comprising:
scheduling, by a scheduler, a write operation across multiple non-contiguous write intervals, the write operation pertaining to data to be stored in a region of a holographic recording medium, wherein the scheduler uses an energy estimation function to perform the scheduling of the write operation, the energy estimation function for estimating an amount of energy required to complete the write operation; and
in each of the non-contiguous write intervals, exposing the region of the holographic recording medium to an interference pattern caused by interference between a reference beam and an input beam carrying the data,
wherein the multiple non-contiguous write intervals have a total aggregate duration of sufficient length to cause a persistent state change in the exposed region, such that the data is recoverable from the exposed region within a final write interval of the multiple non-contiguous write intervals.

2. The method of claim 1, wherein the scheduler performs the scheduling of the write operation by substantially optimizing a cost function that penalizes increases in the estimated amount of energy required to complete the write operation.

3. The method of claim 1, wherein the scheduler performs the scheduling of the write operation by substantially optimizing a cost function that penalizes increases in an estimated latency for the write operation.

4. The method of claim 1, wherein the scheduler performs the scheduling of the write operation by substantially optimizing a cost function that penalizes at least one of:
increases in an estimated latency for a read operation,
increases in an estimated latency for a further write operation, or
increases in an estimated amount of energy required to complete the further write operation.

5. The method of claim 1, further comprising scheduling, by the scheduler, a read operation in a read interval interleaved with the multiple non-contiguous write intervals.

6. The method of claim 1, wherein a further write operation is scheduled across further multiple non-contiguous write intervals interleaved with the multiple non-contiguous write intervals.

7. The method of claim 1, wherein the scheduler schedules at least a later one of the multiple non-contiguous write intervals dynamically, in response to a read operation, at a time during or after an earlier one of the multiple non-contiguous write intervals.

8. A holographic data storage system comprising:
a processor configured to implement a scheduler, the scheduler configured to schedule a write operation across multiple non-contiguous write intervals, the write operation pertaining to data to be stored in a region of a holographic recording medium, the scheduler configured to schedule a further operation in an interval interleaved with the multiple non-contiguous write intervals;
an emitter system configured to emit, in each of the multiple non-contiguous write intervals, a reference beam and an input beam in which the data is embedded;
a holographic recording medium, the holographic data storage system being arranged to expose a region of the holographic recording medium to an interference pattern caused by interference between the input and reference beams in each of the multiple non-contiguous write intervals, thereby carrying out the scheduled write operation; and an optical waveguide network arranged to guide the input beam and the reference beams to the region of the holographic recording medium in each of the multiple non-contiguous write intervals, wherein the system is configured to use the optical waveguide network in the interleaving interval to carry the reference beam to:

another region of the holographic recording medium or another holographic recording medium, with or without varying at least one of an angle or phase characteristic of the reference beam, or the same region of the holographic recording medium but at at least one of a different angle or a different phase characteristic.

9. The system of claim 8, wherein the at least one optical waveguide network has at least one configurable guiding element, and the processor is coupled to the at least one guiding element to cause it to be reconfigured in order to carry the reference beam to the other region of the holographic recording medium in the interleaving interval.

10. The system of claim 8, wherein the at least one optical waveguide network has at least one static guiding element responsive to a controllable optical characteristic of the reference beam, and the processor is coupled to the emitter system to cause the optical characteristic of the reference beam to be changed in order to carry the reference beam to the other region of the holographic recording medium in the interleaving interval.

11. The system of claim 8, wherein the write operation is associated with a logical address, the logical address defining the region of the holographic recording medium and at least one of the angle or phase characteristic of the reference beam.

12. The system of claim 11, wherein the scheduler is configured to schedule a read operation in a read interval interleaved with the multiple non-contiguous write intervals.

13. The system of claim 11, wherein the holographic data storage system is arranged to expose the region or another region of the holographic recording medium to a reference beam in the interleaved interval, thereby generating an output beam for receiving at a detector, thereby carrying out a scheduled read operation.

14. The system of claim 11, wherein the at least one optical waveguide network comprises an active light pipe.

15. A scheduler embodied as executable program code stored on a computer-readable storage medium and configured, when executed on a processor of a holographic data storage system, to perform a write operation in a holographic data storage system comprising:

scheduling, by the scheduler, a write operation across multiple non-contiguous write intervals, the write operation pertaining to data to be stored in a region of a holographic recording medium, wherein the scheduler uses an energy estimation function to perform the scheduling of the write operation, the energy estimation function for estimating an amount of energy required to complete the write operation; and in each of the non-contiguous write intervals, exposing the region of the holographic recording medium to an interference pattern caused by interference between a reference beam and an input beam carrying the data, wherein the multiple non-contiguous write intervals have a total aggregate duration of sufficient length to cause a persistent state change in the exposed region, such that the data is recoverable from the exposed region within a final write interval of the multiple non-contiguous write intervals.

16. The system of claim 15, wherein the scheduler performs the scheduling of the write operation by substantially optimizing a cost function that penalizes increases in the estimated amount of energy required to complete the write operation.

17. The system of claim 15, wherein the scheduler performs the scheduling of the write operation by substantially optimizing a cost function that penalizes increases in an estimated latency for the write operation.

18. The system of claim 15, wherein the scheduler performs the scheduling of the write operation by substantially optimizing a cost function that penalizes at least one of:
increases in an estimated latency for a read operation,
increases in an estimated latency for a further write operation, or
increases in an estimated amount of energy required to complete the further write operation.

19. The system of claim 15, wherein the scheduler is configured to schedule a read operation in a read interval interleaved with the multiple non-contiguous write intervals.

20. The system of claim 15, wherein the scheduler is configured to schedule a further write operation across further multiple non-contiguous write intervals interleaved with the multiple non-contiguous write intervals.

* * * * *